US011813947B1

(12) United States Patent
Pathipati

(10) Patent No.: US 11,813,947 B1
(45) Date of Patent: Nov. 14, 2023

(54) DENSE VEHICLE CHARGING STATION

(71) Applicant: Zoox, Inc., Foster City, CA (US)

(72) Inventor: Vamsi Krishna Pathipati, San Carlos, CA (US)

(73) Assignee: Zoox, Inc., Foster City, CA (US)

( * ) Notice: Subject to any disclaimer, the term of this patent is extended or adjusted under 35 U.S.C. 154(b) by 182 days.

(21) Appl. No.: 17/364,236

(22) Filed: Jun. 30, 2021

(51) Int. Cl.
| | | |
|---|---|---|
| *H01M 10/46* | (2006.01) | |
| *B60L 53/12* | (2019.01) | |
| *H02J 7/00* | (2006.01) | |
| *H02J 50/10* | (2016.01) | |
| *B60L 53/30* | (2019.01) | |
| *H02J 50/90* | (2016.01) | |
| *H02J 50/40* | (2016.01) | |

(52) U.S. Cl.
CPC .............. *B60L 53/12* (2019.02); *B60L 53/30* (2019.02); *H02J 7/0013* (2013.01); *H02J 7/0042* (2013.01); *H02J 50/10* (2016.02); *H02J 50/40* (2016.02); *H02J 50/90* (2016.02)

(58) Field of Classification Search
CPC ...... H02J 7/0042; H02J 7/0013; H02J 50/005; H02J 50/10; H02J 50/30; H02J 50/90; B60L 53/30; B60L 53/12
USPC .......................... 320/104, 107, 108, 116, 109
See application file for complete search history.

(56) References Cited

U.S. PATENT DOCUMENTS

| | | | | |
|---|---|---|---|---|
| 2019/0039463 | A1* | 2/2019 | Moghe | B60L 53/12 |
| 2019/0202304 | A1* | 7/2019 | Moghe | B60L 53/36 |
| 2022/0294277 | A1* | 9/2022 | Wolgemuth | B60L 53/38 |

FOREIGN PATENT DOCUMENTS

| | | | | |
|---|---|---|---|---|
| DE | 102020214965 A1 | * | 6/2022 | |
| FR | 3085655 A1 | * | 3/2020 | |
| WO | WO-2017159506 A1 | * | 9/2017 | ............... H02J 7/00 |

OTHER PUBLICATIONS

Google translate of FR3085655A1 (Mar. 13, 2020). (Year: 2020).*
Google translate of WO2017159506A1 (Sep. 14, 2017) (Year: 2017).*
Google translate of DE102020214965A1 (Jun. 2, 2022) (Year: 2022).*

* cited by examiner

*Primary Examiner* — Edward Tso
(74) *Attorney, Agent, or Firm* — Lee & Hayes, P.C.

(57) ABSTRACT

Techniques for charging a battery associated with a vehicle are discussed herein. A dense charging station for charging the battery may have lanes arranged in parallel, and each of the lanes may have sequential charging locations. A vehicle utilizing the charging station may position itself at the first available charging location, being receiving energy, and determine if a subsequent charging station becomes available in the lane, and then position itself at the subsequent charging location, once available. Multiple charging stations may be required to maintain a threshold power state for individual vehicles in a fleet of vehicles providing a service for a geographic region. A charging coordinator may determine when a battery of a vehicle does not satisfy a threshold power state and requires a recharge. Additionally, the charging coordinator may determine a candidate charging station from among multiple charging stations associated with the geographic region.

20 Claims, 9 Drawing Sheets

DENSE VEHICLE CHARGING STATION

BACKGROUND

Electric vehicles often rely on rechargeable batteries to supply electrical power to various components, such as electric motors. Recharging the battery may present a number of technical considerations. For example, the convenience, the duration, and the safety associated with the charging process may be important factors. For example, providing charging stations at convenient and accessible locations may be a consideration. In addition, reducing the geographic footprint of such charging locations and optimizing the use of the space may be important for some uses of electric vehicles.

Some conventional methods of charging may include charging the battery when a sufficiently low state of charge is reached or after a period of time has elapsed. However, this may result in multiple vehicles seeking charging stations at the same time (e.g., during rush hour), leading to congested regions, longer charge times, and decreased productivity of service vehicles, among other things.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
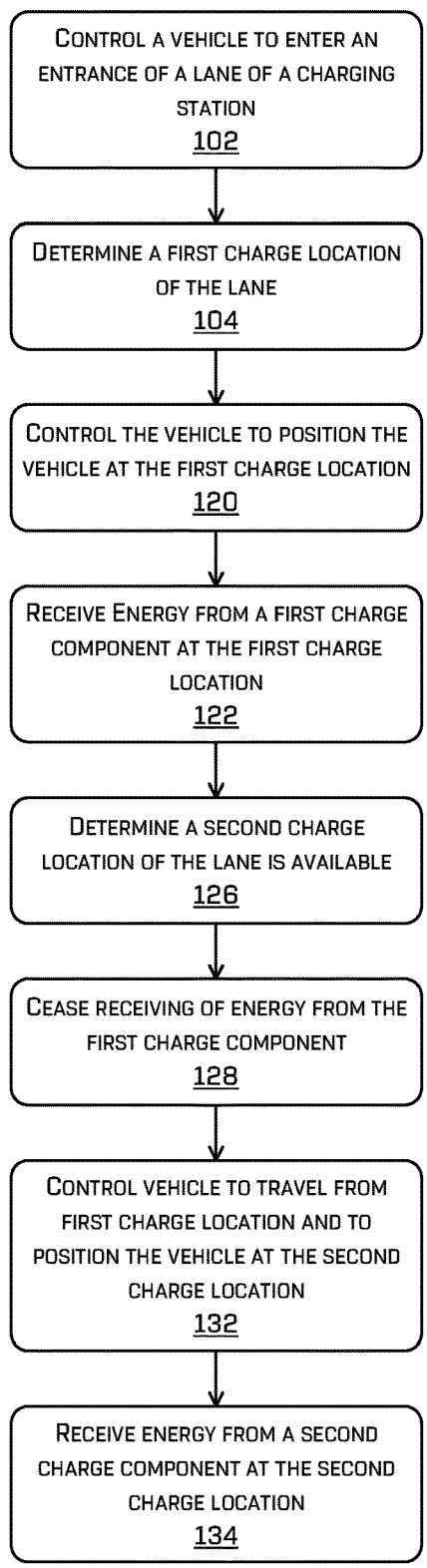
FIG. 1 is a pictorial flow diagram of an example process of controlling a vehicle navigating a dense charging station.
Figure 1:
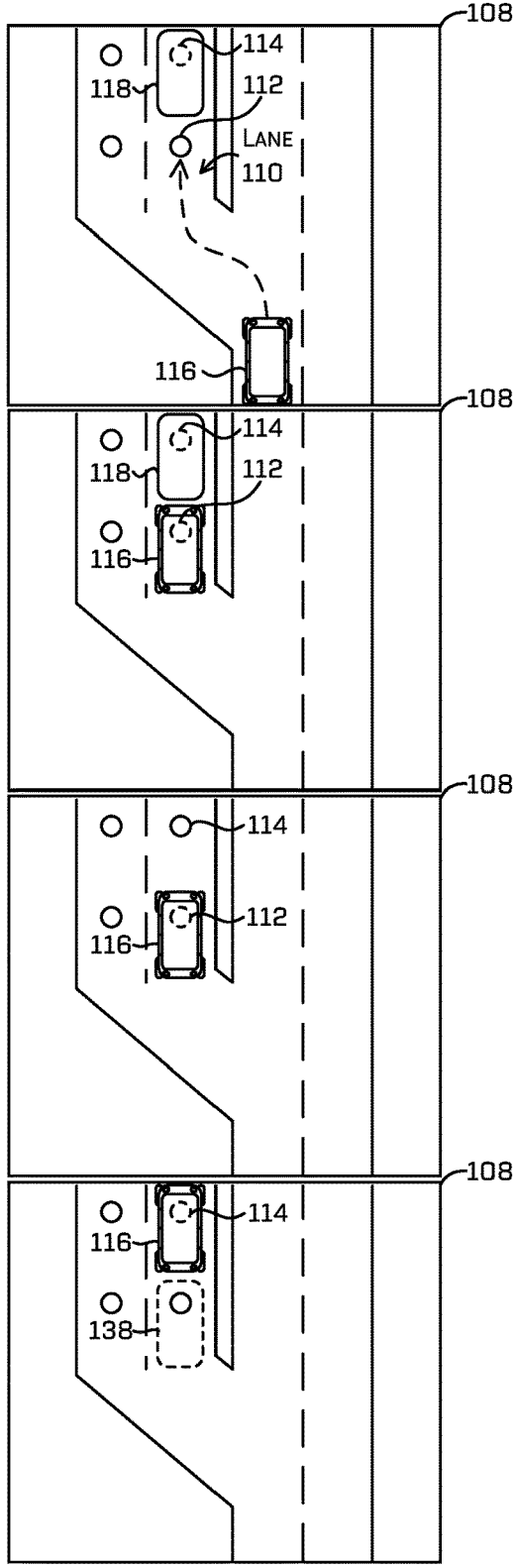

Techniques for charging a power storage unit (e.g., a battery) of a vehicle are discussed herein. For example, techniques may include a dense arrangement of lanes and/or charging components within charging stations associated with a geographic region. In some instances, a charging station may include one or more lane(s) arranged in parallel, each lane comprising one or more sequential charging components. The charging station(s) may be arranged in such a way to maximize the number of vehicles that may be charged at a time and minimizing wait time, while utilizing the least amount of square footage of a geographic region. Additionally, techniques may include instructing a vehicle to efficiently navigate a dense changing station. In some instances, the techniques may include determining, for a vehicle stationed at a charging location in a lane of a charging station, when there is a vacancy in the lane at a subsequent charging location (e.g., positioned in front of the vehicle and/or closer to an exit of the lane) and instructing the vehicle to move from the current charging location in the lane to the vacant charging location. A vehicle may utilize sensor data, captured via onboard sensors, to make such a determination and/or may receive an indication from the charging station and/or a centralized charging coordinator. Additionally, techniques may include managing a fleet of vehicles to coordinate a dynamic charging schedule of the vehicles. In some instances, the techniques may include determining if a current charge state of a vehicle battery satisfies a threshold charge state for providing the service, among other various determinations to decide an optimal time to remove the vehicle from providing the service to charge the battery of the vehicle.

As discussed herein, vehicle charging stations may require a significant area of a geographical region, especially in scenarios where multiple vehicles may receive power at the same time. As such, a densely arranged charging station may be utilized to maximize a number of vehicles that can access the area of the geographic region housing the charging station. In some instances, a charging station may include one or more lanes arranged in parallel. In some examples, the lanes may be arranged sequentially. Additionally, or alternatively, the lanes may be arranged on top of one another. The lane(s) may be accessible from a public roadway via an ingress, arranged such that a vehicle may enter the lane(s) by making a single-point turn. Additionally, or alternatively, the lane(s) may be exited to return to the public roadway via an egress, arranged such that a vehicle may exit the lane(s) by making a single-point turn. The charging station may be one of multiple charging stations associated with the geographic region. The charging stations may comprise one or more electrical power source(s) for providing energy to charging components configured to charge the batteries of the vehicles. In some examples, a charging station may include a single electrical power source for powering all of the charging components. Additionally, or alternatively, a charging station may include multiple individual electrical power sources for powering each individual charging component.

The lane(s) may comprise various components for charging batteries or other power storage components of the vehicles. In some examples, a lane may comprise one or more charging components arranged sequentially from an entrance of the lane to an exit of the lane. Each of the charging components may be spaced apart in the lane at least a threshold distance being substantially similar to a length of a vehicle (e.g., the length a vehicle included in the fleet of vehicles providing the service), a fraction of a length of the vehicle (e.g., ½ a length of the vehicle, ¼ a length of the vehicle), and/or a multiple of a length of the vehicle (e.g., twice the length of the vehicle, three times a length of the vehicle, etc.). In some examples, one or more of the charging components may be configured as a physical or contact-based charging component. Physical charging component(s) may be configured such that a first physical contact of the charge component may transfer energy via a physical connection to a second physical contact of the vehicle and/or battery. Additionally, or alternatively, one or more of the charging components may be configured as a wireless charging component. Wireless charging component(s) may be configured such that a first induction coil of the charge component may transfer energy wirelessly to a second induction coil of the vehicle and/or battery. The first physical contact and/or induction coil may be positioned (e.g., on and/or below a ground surface) to align with the second physical contact and/or induction coil on the vehicle. In some examples, a lane may comprise physical charge components, wireless charge components, or both types of charge components.

Given the dense nature of the charging stations, navigating a vehicle through a charging station may require precise control of the vehicle and awareness of events happening around the vehicle. As such, techniques for instructing and/or controlling vehicles utilizing a charging station may be employed to maximize charging optimization and avoid congestion at a charging station caused by one or more vehicles. In some examples, a vehicle, such as an autonomous vehicle, may be configured to control the vehicle utilizing the charging station autonomously. Additionally, or alternatively, a charging station and/or a centralized charging coordinator may be configured to transmit instructions to a vehicle utilizing the charging station. In some examples, the instructions may comprise commands to utilize data gathered from sensors associated with the vehicle, causing the vehicle to travel from a current position to a target position, and/or causing the vehicle and/or a battery of the vehicle to receive a flow of energy from a charge component of the charge station.

Take for example, a vehicle navigating to a charging station to recharge one or more batteries of the vehicle. Upon arrival at the charging station, the vehicle may be controlled, via an instruction, an operator of the vehicle, and/or autonomously, to enter an entrance of a lane of a charging station. In some examples, the lane may be one of multiple lanes, and may be selected based on various determinations, such as, for example, a number of charge locations of a lane (e.g., a number of vacant charge locations and/or a total number of charge locations), a charging type of a lane (e.g., configured for physical charging, configured for wireless charging, or configured for both), a charging threshold of a lane (e.g., a lane configured for vehicles having less than or equal to half of the battery capacity available and/or a lane configured for vehicles having greater than or equal to half of the battery capacity available, etc.), a lane having an estimated charging time that is less than the other lanes of the charging station, a lane having an immediately accessible charging location, and the like.

Once the vehicle has entered a lane, a first charge location of the lane may be determined. Then, the vehicle may be controlled, via an instruction, an operator of the vehicle, and/or autonomously, to position the vehicle at the first charge location of the lane. Once positioned at the first charge location, charging of a battery of the vehicle may begin. In some examples, the vehicle may begin to receive energy from a first charge component at the first charge location. For example, the vehicle may be further controlled such that a physical charge component of the vehicle contacts a physical charge component of a charge component and the battery may begin receiving energy upon contact of the separate charge components (e.g., the vehicle component contacting the station component). Additionally, or alternatively, a charge component may be configured as a wireless charge component, and the battery may begin receiving the energy wirelessly upon positioning the vehicle at or proximate the first charge location. For instance, the vehicle may begin receiving energy wirelessly based at least in part on a charge component of the vehicle (e.g., a vehicle inductive coil) being positioned within a threshold distance (e.g., in an x, y, and/or z direction) of a charge component of the charging station (e.g., station inductive coil).

In some examples, the vehicle may remain at the first charge location until the battery of the vehicle has reached a threshold charge state (e.g., 50% charged, 75% charged, 90% charged, etc.) and/or has charged to completion. Additionally, or alternatively, the vehicle may receive energy from one or more additional charge components of the lane to reach the threshold charge state and/or to charge to completion. Take, for example, an additional vehicle at the charging station and positioned at a second charging location arranged subsequent to the first charging location in the lane in which the vehicle is positioned. The vehicle may determine that the second charging location is unavailable while the additional vehicle is positioned there, via one or more sensors associated with the vehicle and/or an indication received from the charging station and/or a centralized charging coordinator. The additional vehicle may move away from the second charging location and begin navigating toward the exit of the lane and/or a subsequent charging location. Following movement of the additional vehicle, the original vehicle may determine that the second charge location has become available and may determine to advance to the second charge location to make room for other vehicles at the first charge location. Accordingly, the vehicle may cease receiving energy from the first charge location and the vehicle may be controlled, via an instruction, an operator of the vehicle, and/or autonomously, to position the vehicle at the second charge location of the lane. Once positioned at the second charge location, charging of the battery of the vehicle may resume. In some examples, the vehicle may repeat the cessation of receiving of energy and continue to navigate through the charging station and utilize additional subsequent charging locations as they become available. Vehicles utilizing the charging stations may exercise this logic when navigating the charging stations such that the charging locations that are most proximal to an entrance of the lane are readily available to new vehicles that enter the charging station.

Given the high number of vehicles potentially servicing a geographic area and the limited area utilized for a dense charging location, providing multiple charging stations, determining an optimal time to charge a battery of a vehicle from a fleet of vehicles providing a service, and identifying the most suitable charging station of the multiple charging stations for charging the battery may employ data specific to each individual charging station and/or vehicle of a fleet of vehicles used for providing a service. As such, techniques for managing a fleet of vehicles using a centralized charging coordinator to coordinate a dynamic charging schedule of the vehicles may be employed to determine if a current charge state of a vehicle battery satisfies a threshold charge state for providing the service, among other various determinations to decide an optimal time to remove the vehicle from providing the service to charge the battery of the vehicle. Additionally, or alternatively, the centralized charging coordinator may be configured to coordinate traffic around one or more of the charging stations. In some examples, the centralized charging coordinator may communicate with the traffic around the charging stations and may send and/or receive data representing a charge state of each of the vehicles in the fleet, instructions to control the vehicles, and/or an indication of candidate charging stations for recharging a power storage unit of the vehicle.

Take, for example, a fleet of vehicles providing a service for a geographic region. A first vehicle of the fleet may send, to a server configured to manage one or more charging stations associated with the geographic region (e.g., a centralized charging coordinator), first data that represents a current power state of a battery of the first vehicle. The charging coordinator and/or the vehicle may then determine second data that represents a threshold power state required to provide a service offered by the vehicle for a period of time. In some examples, the second data may be determined based on various factors, such as, but not limited to, a type of the vehicle, a type of service that the vehicle is providing, a current demand for providing the service, an estimated demand for providing the service, a number of additional vehicles providing the service, the amount of time in which the vehicle is providing the service. Additionally, or alternatively, the threshold power state may be determined based on a hardware configuration of the power storage unit of the vehicle. For example, a first hardware configuration may be configured for providing a first service (e.g., a service for delivering packages) and may include a power storage unit configured to store a sufficient amount of power to provide the first service, and a second hardware configuration may be configured for providing a second service that is different from the first service (e.g., a service for transporting passengers), and may include a power storage unit configured to store a sufficient amount of power to provide the second service. By determining the threshold power state required to provide the service, the charging coordinator may determine that the current power state of the battery does not satisfy the threshold power state required to provide the service. Additionally, or alternatively, the charge coordinator may determine to instruct a vehicle to charge a battery at various times even when the current power state satisfies the threshold power state (e.g., a current level of demand for a particular charge station at a particular time may be lower than an average and/or threshold level of demand, a price of electricity offered from a particular charge station may be lower than an average and/or threshold price, etc.). From here, the charging coordinator and/or the vehicle may determine if the vehicle is to navigate to a charging station to charge the battery a sufficient amount to satisfy the threshold charge state required to provide the service and/or if the current power state of the battery satisfies an additional threshold power state required to provide an additional service. An instruction may then be sent to and/or determined by the vehicle to navigate to a charging station and/or provide the additional service.

Once it has been determined that the current power state of the battery does not satisfy the threshold power state required to provide the service for the period of time, the charging coordinator and/or the vehicle may determine a candidate charging station to charge the battery. In some examples, the candidate charging station may be determined from among multiple charging stations associated with the geographical region. Additionally, or alternatively, various factors may be considered when determining the candidate charging station, such as, for example, a distance from the vehicle to the charging station, a distance from a planned future location of the vehicle (e.g., along a route to pick up or drop off a passenger or item) to the charging station, a number of available charging positions at the charging station, an estimated charge time, a predicted level of demand, and the like. In some examples, one factor may be prioritized over and/or weighted more heavily than another. For example, a first charging station may be located the shortest distance from the vehicle, but may have a first estimated charge time that is longer than a second estimated charge time associated with a second charging station that is located a further distance from the vehicle. However, the system may make a determination that the additional distance to travel to the second charging station is less costly than the additional estimated charge time associated with the first charging station. As such, the system may determine the second charging station as the candidate charging station. In some examples, the vehicle and/or charging coordinator may exchange data, associated with the vehicle (e.g., current power state, vehicle location, routes, battery type, battery capacity, vehicle make, vehicle model, vehicle size, charging technologies—contact based and/or inductive—for which the vehicle is configured, etc.), with the individual charging station(s) to get the most accurate estimations regarding charge time, available charging positions, distance, and the like.

With the candidate charging station determined, an instruction may be sent to and/or determined by the vehicle. In some examples, the instruction may instruct the vehicle to navigate to the candidate charging station. Additionally, or alternatively, an additional vehicle, currently located at one of the multiple charging stations associated with the geographical region, may be instructed to provide the service in place of the vehicle that has been instructed to navigate to the candidate charging station.

The techniques discussed herein may improve a functioning of a computing device, such as a computing device of an autonomous vehicle and/or a charging coordinator associated with the autonomous vehicle, in a number of ways. For example, determining when a charging location of a charging station is vacant and causing a vehicle to move through the lane and position itself at the vacant charging station maximizes available charging locations that are accessible for charging vehicles. By prioritizing the charging locations proximal to the exit, if a charging location is available at a charging station, the charging locations positioned near the entrance will be the available locations. Further, such instruction through the charging stations may allow the vehicles to utilize a more densely arranged charging station that requires less area, as described herein. The techniques described herein may also establish and/or maintain, by intelligently managing the vehicles providing the service and the vehicles navigating through charging stations, a balance between the vehicles providing the service and the vehicles removed from the service to charge. Further, by determining an optimal charging station for a vehicle to recharge a battery, vehicles may experience less congested charging stations resulting in shorter charge times. As a result of the shorter time needed to charge a battery, a fleet of vehicles may be able to provide the service with an increased level of efficiency as the vehicles will be removed from providing the service for a lesser period of time to charge a battery.

The techniques described herein may be implemented in a number of ways. Example implementations are provided below with reference to the following figures. Although discussed in the context of an autonomous vehicle, the methods, apparatuses, and systems described herein may be applied to a variety of systems (e.g., a sensor system or a robotic platform), and are not limited to autonomous vehicles. In one example, similar techniques may be utilized in driver-controlled vehicles in which such a system may provide an indication of whether it is safe to perform various maneuvers. In another example, the techniques may be utilized in a manufacturing assembly line context, in an aerial surveying context, or in a nautical context. Additionally, the techniques described herein may be used with real data (e.g., captured using sensor(s)), simulated data (e.g., generated by a simulator), or any combination of the two.

FIG. 1 is a pictorial flow diagram of an example process 100 of controlling a vehicle navigating a dense charging station.

At operation 102, the process may include controlling a vehicle to enter an entrance of a lane of a charging station. Additionally, or alternatively, at operation 104, the process may include determining a first charge location of the lane. An example 106 illustrates at least a portion of a charging station 108 including a lane 110, a first charge location 112 of the lane 110, and a second charge location 114 of the lane 110. In some examples, a vehicle 116 may enter the entrance of the charging station 108, via an ingress, such that the vehicle 116 may enter a lane 110 of the charging station 108 by making a single-point turn. For example, the vehicle 116 may determine that the lane 110, of multiple candidate lanes of the charging station 108, has a first charge location 112 available, and as such may enter the lane 110. Additionally, or alternatively, the vehicle 116 may receive a command, a signal, and/or an instruction from the charging station 108 and/or a centralized charging coordinator instructing the vehicle 116 to enter the lane 110 of the charging station 108. In some examples, one or more additional vehicles, such as, for example, additional vehicle 118 may be positioned at the second charge location 114 of the lane 110.

In some examples, the vehicle 116 may determine that the lane 110 has the first charge location 112 available based on sensor data captured by the vehicle 114. For example, the vehicle 116 may receive sensor data from a sensor operating in connection with a perception system of the vehicle 116 (e.g., autonomous vehicle), in an area of an environment. In some examples, the area of the environment may include the charging station 108, the lane, 110, the first charging location 112, the second charge location 114, and/or the additional vehicle 118. Although discussed in the context of sensor data, the operation 104 can include receiving any three-dimensional data or data comprising a depth component. The semantic information can include, for example, one or more semantic classification(s), label(s), or segmentation information. In some instances, the operation 104 can include receiving a plurality of sensor datasets from a plurality of sensors operating in connection with the perception system. In some instances, the operation 104 can include combining or fusing data from two or more sensors (and/or over a period of time) into a single lidar dataset (also referred to as a "meta spin"). In some instances, the operation 102 can include extracting a portion of the sensor data for processing, such as over a period of time. In some instances, the operation 104 can include receiving radar data (or other sensor data) and associating the radar data with the sensor data to generate a more detailed representation of an environment.

As noted above, the sensor data (e.g., sensor dataset(s)) can be associated with semantic information. An example of such techniques for determining and associating the sensor data with the semantic information are discussed in, for example, in U.S. patent application Ser. No. 15/820,245 titled "Sensor Data Segmentation" and filed Nov. 21, 2017, which is incorporated by reference herein in its entirety for all purposes.

At operation 120, the process 100 may include controlling the vehicle 116 to position the vehicle 116 at the first charging location 112. In some examples, with the first charging location 112 of the lane 110 determined, the vehicle 116 may move from the entrance of the lane 110 to the first charging location 112, and position itself in an alignment with the first charging location 112 such that the vehicle 116 may be prepared to receive energy and/or power from a charging component of the first charging location 112. Additionally, or alternatively, the vehicle 116 may receive a command, a signal, and/or an instruction from the charging station 108 and/or a centralized charging coordinator instructing the vehicle 116 to position itself at the first charging location 112 such that the vehicle 116 may be prepared to receive energy and/or power from a charging component of the first charging location 112. Additionally, or alternatively, the operation 120 may include controlling a suspension system of the vehicle 116 to lower a charge component of the vehicle 116 toward a charge component at the first charge location 112.

At operation 122, the process 100 may include receiving energy from a first charge component at the first charge location 112. In some examples, the first charge component may be configured as a wireless charging component, as described herein with respect to FIG. 5, and/or a contact charging component, as described herein with respect to FIG. 6.

An example 124 illustrates the charging station 108 with the vehicle 116 positioned at the first charging location 112 and the additional vehicle 118 positioned at the second charging location 118. In some examples, the vehicle 116 may be positioned over the first charging location 112 to begin receiving the energy from the first charge component at the first charge location 112. Additionally, or alternatively, the vehicle 116 may be configured to receive the energy from first charge component at the first charge location 112 while the vehicle is in motion and proximate to the first charge location 112 and/or stationary at the first charge location 112. Example methods of receiving the energy from a charge component are described herein with respect to FIGS. 5 & 6.

At operation 126, the process 100 may include determining that the second charge location 114 of the lane 110 is available. For example, the additional vehicle 118 at the charging station 108 that was previously positioned at the second charging location 114 arranged subsequent to the first charging location 112 in the lane 110 in which the vehicle 116 is positioned. The vehicle 116 may determine that the second charging location 114 is unavailable while the additional vehicle 118 is positioned at the second charging location 114, via one or more sensors associated with the vehicle 116 and/or an indication received from the charging station 108 and/or a centralized charging coordinator. The additional vehicle 118 may move away from the second charging location 114 and begin navigating toward the exit of the lane 110 and/or a subsequent charging location. Following movement of the additional vehicle 118, the vehicle 116 may determine that the second charge location 114 has become available.

At operation 128, the process 100 may include ceasing to receive the energy from the first charge component at the first charge location 112. In some examples, the operation 128 may include controlling a suspension system of the vehicle 116 to raise a charge component of the vehicle 116 away from a charge component at the first charge location 112 to cease receiving the energy.

An example 130 illustrates the charging station 108 including the vehicle 116 positioned at the first charging location 112 of the lane 110, and the vacant second charging location 114. In some examples, the second charge location 114 of the lane 110 may be positioned closer to an exit of the lane 110 than the first charge component 112. In some examples, the one or more sensors associated with the vehicle 116 may indicate that the second charging location 114 is vacant and/or available.

At operation 132, the process 100 may include controlling the vehicle 116 to travel from the first charge location 112 and to position the vehicle 116 at the second charge location 114 of the lane 110. In some examples, once determined that the second charging location 114 of the lane 110 is available, the vehicle 116 may move from the first charging location 112 to the second charging location 114, and position itself in an alignment with the second charging location 114 such that the vehicle 116 may be prepared to receive energy and/or power from a charging component of the second charging location 114. Additionally, or alternatively, the vehicle 116 may receive a command, a signal, and/or an instruction from the charging station 108 and/or a centralized charging coordinator instructing the vehicle 116 to position itself at the second charging location 114 such that the vehicle 116 may be prepared to receive energy and/or power from a charging component of the second charging location 114. Additionally, or alternatively, the operation 132 may include controlling a suspension system of the vehicle 116 to lower a charge component of the vehicle 116 toward a charge component at the second charge location 114.

At operation 134, the process 100 may include receiving energy from a second charge component at the second charge location 114. In some examples, the second charge component may be configured as a wireless charging component, as described herein with respect to FIG. 5, and/or a contact charging component, as described herein with respect to FIG. 6.

An example 136 illustrates the charging station 108 with the vehicle 116 positioned at the second charging location 114. The previous position 138 of the vehicle 116 is illustrated as an example of the movement from the first charge location 112 to the second charge location 114. In some examples, the vehicle 116 may be positioned over the second charging location 114 to begin receiving the energy from the first charge component at the second charge location 114. Example methods of receiving the energy from a charge component are described herein with respect to FIGS. 5 & 6.

Figure 2:
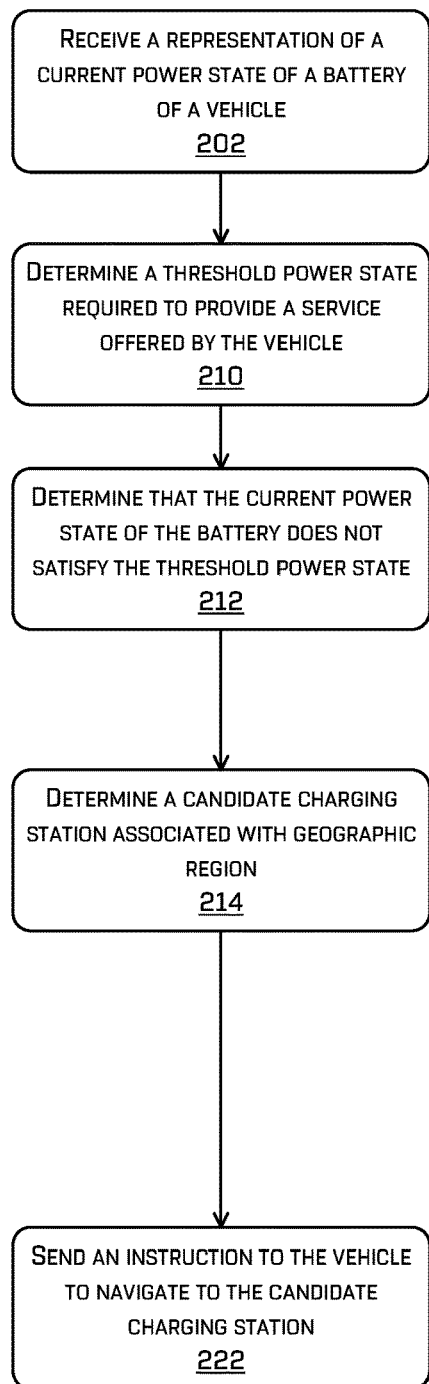
FIG. 2 is a pictorial flow diagram of an example process of determining when to charge a battery of a service vehicle.
Figure 2:
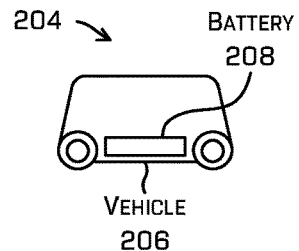
Figure 2:
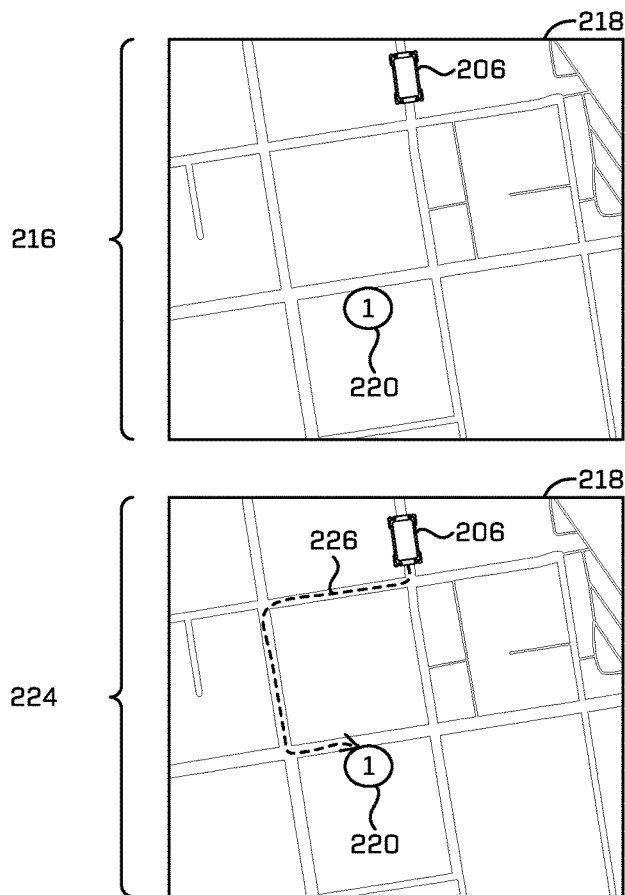

FIG. 2 is a pictorial flow diagram of an example process 200 of determining when to charge a battery of a service vehicle. As described herein, a service vehicle (e.g., an autonomous vehicle) may be included in a fleet of service vehicles configured to provide a service. In some examples, a centralized charging coordinator may be associated with one or more charging stations of a geographic region, and/or may be configured to schedule the charging of individual service vehicles in the fleet. For example, the charging coordinator may be configured to maintain a balance between vehicles that are providing the service, and vehicles that are charging an associated battery to provide the service (e.g., a number of vehicles deployed to provide the service sufficiently and a number of vehicles charging such that the charging stations do not become congested).

At operation 202, the process may include receiving a representation of a current power state of a battery of a vehicle. In some examples, a centralized charging coordinator may receive the representation of the current power state of the battery of the vehicle. Additionally, or alternatively, a charging station may receive the representation of the current power state of the battery of the vehicle from the vehicle and/or directly measure a power state of a battery of a vehicle (e.g., via a charging connector).

An example 204 illustrates the vehicle 206 and a battery 208 of the vehicle. In some examples, the battery 208 of the vehicle 206 may be configured to be onboard the vehicle 206 or otherwise carried by the vehicle 206. Additionally, or alternatively, the battery 208 of the vehicle may be configured to be removed from the vehicle 206.

At operation 210, the process 200 may include determining a threshold power state required to provide a service offered by the vehicle 206. In some examples, the threshold power state may be based on a period of time which the vehicle 206 may provide the service, a geographic region in which the vehicle 206 will be providing the service, a size of the geographic region, a number of additional vehicles in the fleet providing the service, and/or a current and/or predicted level of demand associated with the service. In some examples, the service may be a first service of multiple services that the vehicle is configured to provide.

At operation 212, the process 200 may include determining whether the current power state of the battery 208 satisfies the threshold power state required to provide the service. In some examples, the current power state of the battery 208 may satisfy the threshold power state required to provide the service, and as such, the vehicle 206 may continue to provide the service. Additionally, or alternatively, the current power state of the battery 208 may not satisfy the threshold power state required to provide the service, and as such, the vehicle 206 may be temporarily removed from providing the service and instructed to navigate to a charging station to recharge the battery 208. Additionally, or alternatively, based on the determination that the current power state of the battery 208 does not satisfy the threshold power state required to provide the service, the charging coordinator may identify an additional service offered by the vehicle 206 that is different from the service, and may determine that the current power state of the battery 208 satisfies an additional threshold power state required to provide the additional service, and may instruct the vehicle 206 to provide the additional service.

At operation 214, the process 200 may include determining that the current power state of the battery 208 does not satisfy the threshold power state required to provide the service. Based on the determination, the process 200 may include determining a candidate charging station to instruct the vehicle 206 to navigate to and recharge the battery 208. In some examples, the charging coordinator may select the candidate charging station from among multiple charging stations associated with the geographical region. In some examples, the candidate charging station may be determined based on at least one of a distance of the candidate charging station from a current location of the vehicle 206, a number of available charging positions at the candidate charging station, an estimated time to charge the battery 208 of the vehicle 206 at the candidate charging station, a predicated demand for the candidate charging station, and the like.

An example 216 illustrates a portion of the geographic region 218 including the vehicle 206 and the candidate charging station 220. In some examples, although not illustrated, one or more additional charging stations may be included in the geographic region 218. In some examples, the candidate charging station 220 may be positioned such that it is accessible via a roadway of the geographic region 218.

At operation 222, the process 200 may include sending an instruction to the vehicle 206 to navigate to the candidate charging station 220. In some examples, the instruction to navigate to the candidate charging station 220 may include a route from the vehicle 206 to the candidate charging station. Additionally, or alternatively, the route may be configured to control the vehicle 206 and cause the vehicle 206 to travel to the candidate charging station 220. An example 224 illustrates the portion of the geographic region 218 including the vehicle 206, the candidate charging station 220, and a route 226 from the vehicle to the candidate charging station. In some examples, the vehicle 206 may navigate to the candidate charging station 220 based on the route 226.

Figure 3:
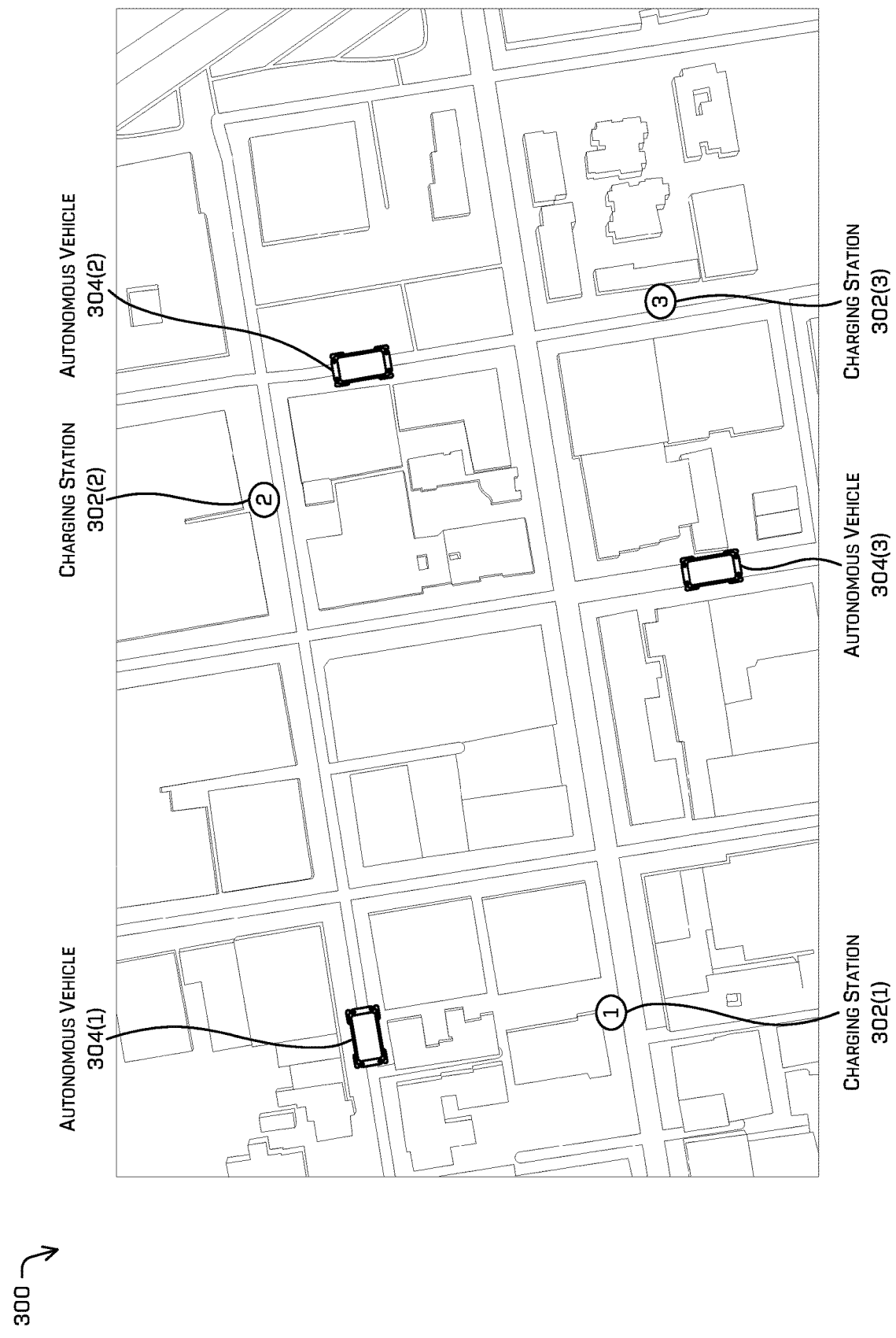
FIG. 3 depicts an example geographic region including charging stations and vehicles providing a service.

FIG. 3 depicts an example portion of a geographic region 300 including charging stations 302(1)-302(3) and vehicles 304(1)-304(3) configured for providing a service, as described herein. As described herein, a charging coordinator may be associated with a geographic region and configured to coordinate a dynamic charging schedule of the vehicles. In some examples, the charging coordinator may determine if a current charge state of a vehicle battery satisfies a threshold charge state for providing the service, among other various determinations, to decide an optimal time to remove the vehicle from providing the service to charge the battery of the vehicle and determine a candidate charging station from among multiple charging stations associated with the geographic region.

Take, for example, a fleet of vehicles 304(1), 304(2), and 304(3), providing a service for a geographic region 300, and a server configured to manage one or more charging stations 302(1), 302(2), and 302(3), associated with the geographic region 300 (e.g., a centralized charging coordinator). Although the example illustration depicts 3 vehicles in the fleet and 3 charging stations associated with the geographic region, the fleet of vehicles may include any number of vehicles 304, and/or the geographic region 300 may have any number of associated charging stations 302. In some examples, each of the vehicles 304 may be configured to provide a number of services, and each of the services may have an associated threshold power state required to provide the service.

A first vehicle 304(1) of the fleet may send first data that represents a current power state of a battery of the first vehicle 304(1) to the charging coordinator. The charging coordinator (or the first vehicle 304(1)) may then determine second data that represents a threshold power state required to provide a service offered by the first vehicle 304(1) for a period of time. In some examples, the second data may be determined based on various factors, such as, but not limited to, a type of the vehicle 304(1), a type of service that the vehicle 304(1) is providing, an estimated demand for providing the service, a number of additional vehicles (e.g., 304(2) and/or 304(3)) providing the service, the amount of time in which the vehicle 304(1) is providing the service. By determining the threshold power state required to provide the service, the charging coordinator may determine that the current power state of the battery does not satisfy the threshold power state required to provide the service. From here, the charging coordinator and/or the first vehicle 304(1) may determine if the first vehicle 304(1) is to navigate to a charging station 302(1)-302(3) to charge the battery a sufficient amount to satisfy the threshold charge state required to provide the service and/or if the current power state of the battery satisfies an additional threshold power state required to provide an additional service. An instruction may then be sent to and/or determined by the first vehicle 304(1) to navigate to a charging station 302(1)-302(3) and/or provide the additional service.

Once it has been determined that the current power state of the battery does not satisfy the threshold power state required to provide the service for the period of time, the charging coordinator and/or the first vehicle 304(1) may determine a candidate charging station to charge the battery. In some examples, the candidate charging station may be determined from among multiple charging stations 302 associated with the geographical region 300. Various factors may be considered when determining the candidate charging station, such as, for example, a distance from the first vehicle 304(1) to the charging station(s) 302(1)-302(3), respectively, a number of available charging positions at the respective charging stations 302, an estimated charge time associated with the respective charging stations 302, a predicted level of demand for the service, and the like.

In some examples, one factor may be prioritized over another. For example, a first charging station 302(1) may be located the shortest distance from the first vehicle 304(1), but may have a first estimated charge time that is longer than a second estimated charge time associated with a second charging station 302(2) and/or a third estimated charge time associated with a third charging station 302(3) that is located a further distance from the first vehicle 302(1). However, the system may make a determination that the additional distance to travel to the second charging station 302(2) is less severe than the additional estimated charge time associated with the first charging station 302(1). As such, the system may determine the second charging station 302(2) as the candidate charging station. In some examples, the first vehicle 304(1) and/or charging coordinator may exchange data, associated with the first vehicle 304(1) (e.g., current power state, vehicle location, battery type, etc.), with the individual charging station(s) 302 to get the most accurate estimations regarding charge time, available charging positions, distance, and the like.

With the candidate charging station 302(2) determined, an instruction may be sent to and/or determined by the first vehicle 304(1). In some examples, the instruction may instruct the first vehicle 304(1) to navigate to the candidate charging station 302(2). Additionally, or alternatively, an additional vehicle, such as, the second vehicle 304(2) and/or the third vehicle 304(3), currently located at one of the multiple charging stations 302 associated with the geographical region 300 and/or traveling through the geographical region 300, may be instructed to provide the service in place of the first vehicle 304(1) that has been instructed to navigate to the candidate charging station 302(2). Once the first vehicle 304(1) has navigated to the candidate charging station 302(2), the first vehicle 304(1) may be instructed, or otherwise controlled, through the second charging station 302(2) in accordance with the description of FIG. 4.

Figure 4:
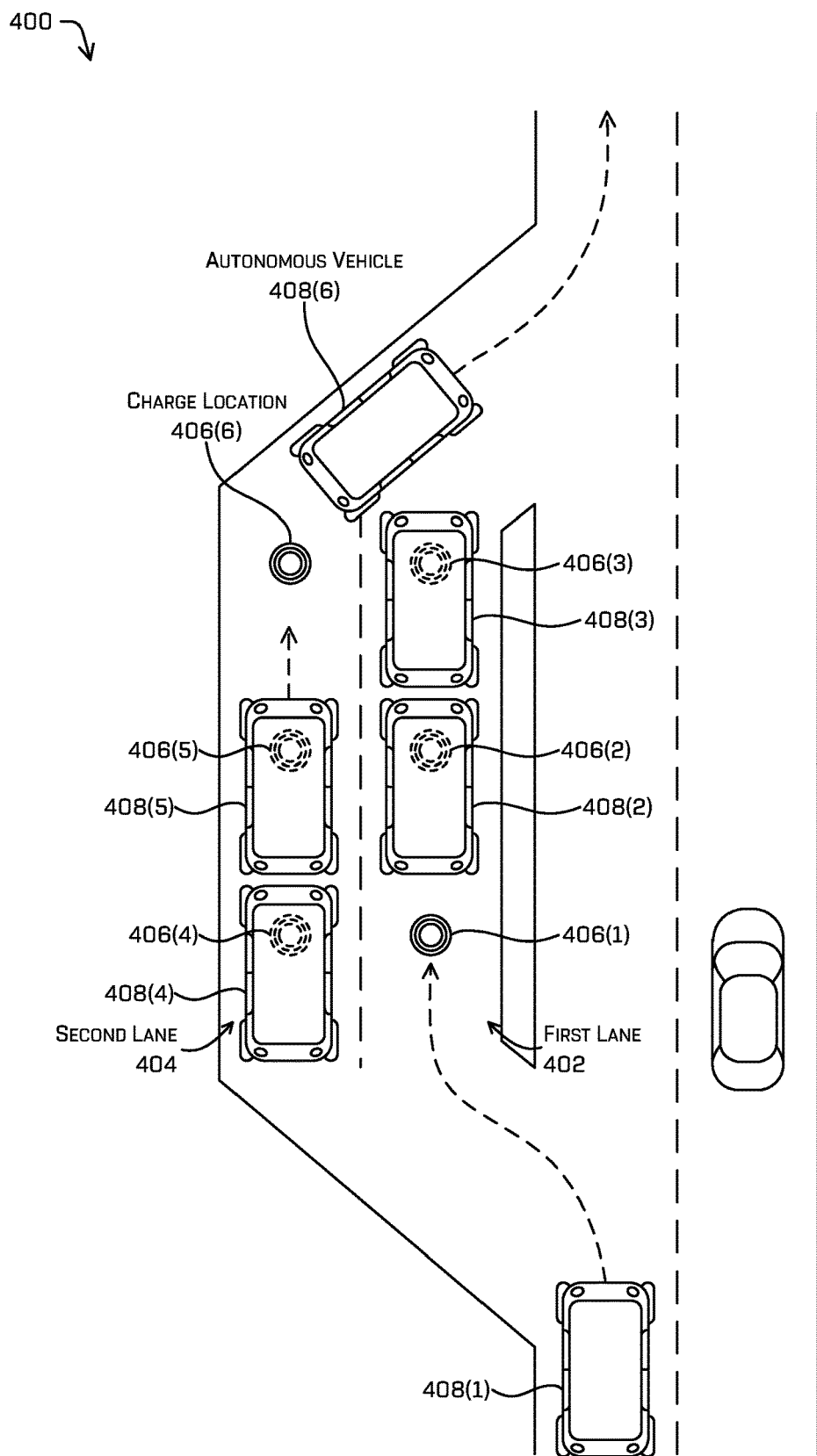
FIG. 4 depicts an example charging station including parallel lanes and sequential charging locations.

FIG. 4 depicts an example charging station 400 including parallel lanes and sequential charging locations. In some examples, the charging station 400 may include one or more lanes, such as, for example, a first lane 402 and a second lane 404. In some examples, the lanes 402, 404 may be arranged side-by-side in a sequential order. Additionally, or alternatively, the lanes 402, 404 may be arranged on top of one another. In some examples, the first lane 402 may include one or more sequential charging locations (also referred to herein as charging positions), such as, for example, a first charging location 406(1), a second charging location 406(2), and a third charging location 406(3). Additionally, or alternatively, the second lane 404 may include one or more sequential charging locations, such as, for example, a first charging location 406(4), a second charging location 406(5), and a third charging location 406(6). In some examples, one or more sensor(s) associated with a vehicle 408 may be utilized to determine a charge location 406, an available charge location 406(1), and occupied charge location 406(4), an entrance of the charge station 400, an exit of the charge station 400, and/or a lane 402, 404 of the charge station 400.

As previously mentioned, a vehicle 408 under control of a centralized charging coordinator, as described herein with respect to FIGS. 2 and 3, may be instructed to navigate to a charging station 400. For example, it may be determined that a current power state of battery associated with a vehicle 408 does not satisfy a threshold power state required for the vehicle 408 to provide the service. As such, the vehicle 408, may be controlled and/or instructed to navigate to a charging station 400, and the vehicle 408 may enter the charging station 400 via an ingress of the charging station 400 (e.g., the illustrated vehicle 408(1) entering the first lane 402 of the charging station 400 from the public roadway). Once the battery of the vehicle 408 has reached a sufficient power state, the vehicle 408(1) may exit the charging station 400 via an egress of the charging station 400 (e.g., the illustrated vehicle 408(6) exiting the charging station 400 from the second lane 404 and onto the public roadway).

Take for example, a first vehicle 408(1) navigating to a charging station 400 to recharge one or more batteries of the vehicle 408(1). Upon arrival at the charging station 400, the first vehicle 408(1) may be controlled, via an instruction, an operator of the first vehicle 408(1), and/or autonomously, to enter an entrance of a first lane 402 of the charging station 400. In some examples, the first lane 402 may be one of multiple lanes, such as, for example, the first lane 402 and the second lane 404, and may be selected based on various determinations, such as, for example, a number of charge locations 406 of a lane (e.g., a number of vacant charge locations 406 and/or a total number of charge locations 406), a charging type of a lane (e.g., configured for physical charging, configured for wireless charging, and/or configured for both), a charging threshold of a lane (e.g., a lane configured for vehicles 408 having less than or equal to half of the battery capacity available and/or a lane configured for vehicles 408 having greater than or equal to half of the battery capacity available, etc.), a lane having an estimated charging time that is less than the other lanes of the charging station 400, a lane having an immediately accessible charging location (e.g., the first lane 402 having the first charging position 406(1) immediately available to the first vehicle 408(1)), and the like.

Once the first vehicle 408(1) has entered the first lane 402, a first charge position 406(1) of the first lane 402 may be determined. Then, the first vehicle 408(1) may be controlled, via an instruction, an operator of the vehicle 408(1), and/or autonomously, to position the first vehicle 408(1) at the first charge position 406(1) of the first lane 402. Additionally, or alternatively, one or more sensor(s) associated with the first vehicle 408(1) may provide an indication of the first charge position 406(1) of the first lane 402. Once positioned at the first charge location 406(1), charging of a battery of the first vehicle 408(1) may begin. In some examples, the first vehicle 408(1) may begin to receive energy from a first charge component at the first charge position 406(1). For example, the first vehicle 408(1) may be further controlled such that a physical charge component of the first vehicle 408(1) contacts a physical charge component of a charge component at the first charging position 406(1) and the battery may begin receiving energy upon contact of the separate charge components (e.g., the vehicle component contacting the station component). Additionally, or alternatively, a charge component may be configured as a wireless charge component, and the battery may begin receiving the energy upon positioning the first vehicle 408(1) at the first charge location 406(1) without additional action.

In some examples, a vehicle may remain at a charge location until the battery of the vehicle has reached a threshold charge state and/or has charged to completion. Additionally, or alternatively, a vehicle may receive energy from one or more additional charge components of a lane to reach the threshold charge state and/or to charge to completion.

Take, for example, a first vehicle 406(6) in the second lane 404 at the charging station 400 and positioned at a first charging position 406(6) arranged subsequent to a second charging position 406(5) in the second lane 404 in which the first vehicle 408(6) is positioned. A second vehicle 408(5), positioned at the second charging position 408(6) and/or receiving power from a charge component at the second charging position 406(5), may determine that the subsequent first charging location 406(6) is unavailable while the first vehicle 408(6) is positioned there, via one or more sensors associated with the second vehicle 408(5) and/or an indication received from the charging station 400 and/or a centralized charging coordinator. The first vehicle 408(6) may move away from the first charging location 406(6) and begin navigating toward the exit of the second lane 404 (as illustrated) and/or a subsequent charging location. Following movement of the first vehicle 408(6), the second vehicle 408(5) may determine that the first charge location 406(6) has become available. Accordingly, the second vehicle 408(5) may cease receiving energy from the second charge location 406(5) and the second vehicle 408(5) may be controlled, via an instruction, an operator of the vehicle 408(5), and/or autonomously, to position the second vehicle 408(5) at the first charge location 406(6) of the second lane 404. Once positioned at the first charge location 406(6), charging of the battery of the second vehicle 408(5) may resume.

In some examples, a vehicle 408 may repeat the cessation of receiving of energy and continue to navigate through the charging station 400 and utilize additional subsequent charging locations 406 as they become available. Vehicle(s) 408 utilizing the charging stations 400 may exercise this logic when navigating the charging stations 400 such that the charging locations 406 that are most proximal to an entrance of a lane 402, 404 are readily available to new vehicles 408(1) that enter the charging station 400.

Figure 5:
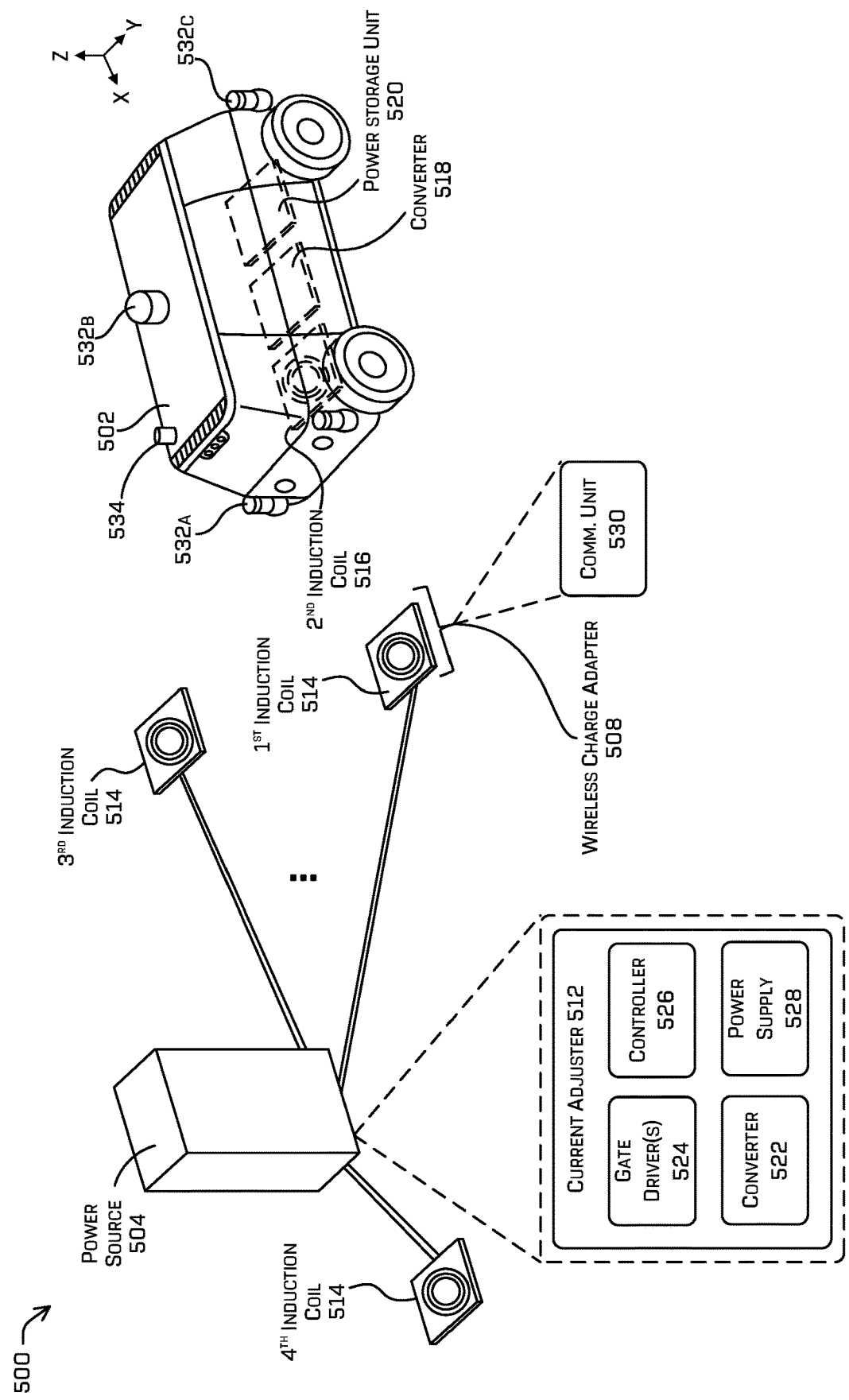
FIG. 5 is an example environment in which an example vehicle may maneuver into position during an example recharging event with a wireless charging connection.

FIG. 5 is an example environment 500 in which an example vehicle may maneuver into position during an example recharging event with a wireless charging connection. The example vehicle 502 may be any configuration of vehicle, such as, for example, a van, a sport utility vehicle, a cross-over vehicle, a truck, a bus, an agricultural vehicle, and a construction vehicle. The vehicle 502 may be powered by one or more electric motors, one or more internal combustion engines, any combination thereof (e.g., by a hybrid power train), and/or any other suitable electric power sources. For the purpose of illustration, the example vehicle 502 is an at least partially electrically powered vehicle having two electrical propulsion units configured to provide the vehicle 502 with the ability to maneuver, each including a motor/inverter electrically coupled to one or more batteries configured to be recharged, as explained herein. For example, the vehicle 502 may be a bidirectional vehicle having a first drive module positioned in a front end and a second drive module positioned in a rear end. As used herein, a bidirectional vehicle is one that is configured to switch between traveling in a first direction of the vehicle and a second, opposite, direction of the vehicle. In other words, there is no fixed "front" or "rear" of the vehicle 502. In other examples, the techniques described herein may be applied to vehicles other than bidirectional vehicles. In some examples, the vehicle 502 may correspond to the vehicle as described with respect to FIGS. 1-4.

The example environment 500 is depicted with an X, Y, and Z coordinate frame. In some examples, the X-axis may correspond to a longitudinal direction of the vehicle 502, the Y-axis may correspond to a lateral direction of the vehicle 502, and/or the Z-axis may correspond to a vertical direction of the vehicle 502. Additionally, or alternatively, a ground and/or support surface may be disposed on the XY-plane of the coordinate frame, and the Z-axis may be configured perpendicular to the XY-plane.

An example of such techniques for maneuvering a vehicle into position during a recharging event with a wireless charging connection are discussed in, for example, in U.S. patent application Ser. No. 17/334,275 titled "DC FAST CHARGER WIRELESS-CHARGING ADAPTER" and filed May 28, 2021, which is incorporated by reference herein in its entirety for all purposes.

The vehicle 502 may also include sensors 532a-532c, which may include a perception sensor, including a sensor capturing data of an environment around the vehicle 502 (e.g., lidar, camera, time-of-flight, sonar, radar, etc.). In addition, the vehicle 502 can also include one or more communication units 534 that enable communication between the vehicle 502 and one or more other local or remote computing devices via one or more protocols. For example, the vehicle 502 may exchange communications with other devices in the environment 500 (e.g., the power source 504 or the adapter 508) and/or with remote devices (e.g., a remote teleoperation computing device). Communications may be exchanged via physical and/or logical interfaces. For example, the communication unit 534 may enable Wi-Fi-based communication such as via frequencies defined by the IEEE 802.11 standards, short range wireless frequencies (e.g., Bluetooth, Zigbee, etc.), cellular communication (e.g., 2G, 3G, 4G, 4G LTE, 5G, etc.), satellite communication, dedicated short range communications (DSRC), or any suitable wired or wireless communications protocol that enables the respective computing device to interface with the other computing device(s).

The environment 500 also includes a contact-based power source 504 (e.g., charging component, charging location, and/or charging position). In accordance with examples of the disclosure, a wireless-charging adapter 508 (also referred to herein as a wireless charging component) may be coupled to the power source 504 (e.g., mated with the electrical connector 510 via a contact-based coupling) to facilitate wireless charging. The adapter 508 may be plugged into the DC fast charger and remain connected between charging sessions. In other examples, the adapter 508 may be plugged in, and unplugged, between charging sessions. For instance, in some examples, the adapter 508 may be unplugged and transported with the vehicle 502 between charging sessions. At a high level, the adapter 508 includes an electrical connector 510; a communications unit 530; and a first induction coil 514. Additionally, or alternatively, the power source 504 may be configured to provide power to one or more additional induction coils 514 connected by respective connectors 510 (e.g., $3^{rd}$ induction coil 514 and/or $4^{th}$ induction coil 514). While 3 induction coils 514 are illustrated, any number of induction coils 514 may be contemplated. In some examples, the power source 504 may include a current adjuster 512, including hardware and software for managing and facilitating adapter 508 operations. In examples of the disclosure, the example vehicle 502 may be configured to use the adapter 508 for charging one or more batteries coupled to the vehicle 502. For example, the vehicle 502 may include a second induction coil 516 (e.g., mounted underneath the vehicle) to wirelessly receive a charge from the first induction coil 514, a converter (e.g., power converter) to convert the AC from the first induction coil to DC, and a power storage unit 520 (e.g., a battery) to store the DC from the converter. The converter may include various components, such as an inverter, a rectifier, and/or a bi-directional AC to DC converter. In some examples, the second induction coil 516, the converter, and the power storage unit 520 may be part of the central body of the vehicle 502. In other instances, the second induction coil 516, the converter, and the power storage unit 520 may be part of one or more detachable drive assemblies. In alternative examples, each drive assembly may have a power storage unit, while the second induction coil 516 and the converter are attached to the vehicle body and are connectable to the power storage unit 520. In other examples, the second induction coil 516, the converter, and the power storage unit 520 may include a module that can be connected to, and disconnected from, other vehicle components (e.g., drive assembly), such as for retrofitting and/or modularizing.

Additionally, as illustrated, a schematic block diagram shows the adapter 508 coupled to the power source 504 (via the connector 510), and additional components of the adapter 508 are depicted. In accordance with examples of the disclosure, the adapter 508 and/or the power source 504 includes the current adjuster 512 with various hardware and software for controlling and performing operations of the adapter 508. In some examples, the adapter 508 may include a disconnect device (not illustrated), such as a contactor, which may both establish and interrupt power from the power source 504 to the adapter 508 as necessary.

In additional examples, the current adjuster 512 can include a converter 522 (e.g., full-bridge DC to AC high frequency inverter, bi-directional converter, power converter, etc.) for changing a DC provided by the power source 504 to an AC to be provided to the first induction coil 514. In addition, the current adjuster 512 can include gate driver(s) 524 for controlling switches in the converter 522 and a controller 526, such as a microcontroller and/or control board. Among other things, the controller 526 may control operations of the current adjuster 512 (e.g., gate-driver operations, switch positions, disconnect device, etc.) and communicate with one or more other components to facilitate wireless charging. In addition, the controller 526 may include one or more processors and one or more computer-readable storage media storing instructions executable by the one or more processors, wherein the instructions, when executed, cause the controller 526 to perform operations. By way of example and not limitation, the processor(s) may include one or more Central Processing Units (CPUs), Graphics Processing Units (GPUs), field-programmable gate array (FPGA), complex programmable logic device (CPLD), integrated circuit(s), etc., or any other device or portion of a device that processes electronic data to transform that electronic data into other electronic data that can be stored in registers and/or memory. In addition, the computer-readable storage media may include both volatile and nonvolatile media and/or removable and non-removable media implemented in any method or technology for storage of information such as computer-readable instructions, data structures, program modules, and/or other data types. For example, the memory may store computer-readable instructions. Computer-storage media may include, but is not limited to, non-transitory media such as RAM, ROM, EEPROM, flash memory or other memory technology, or any other medium which may be used to store the desired information and which may be accessed by controller 526.

Furthermore, the current adjuster 512 can include a power supply 528 (e.g., power supply unit) to provide power to components of the current adjuster 512, such as to the gate driver(s) 524 and the controller 526. The power supply 528 may include various types of power supply units (e.g., isolated power supply unit), and in some instances, the power supply 528 may convert a current to a low voltage DC. The power supply 528 may also (or alternatively) include one or more other sources of DC, such as one or more batteries, solar-powered sources, etc. In some examples of the disclosure, the power supply 528 may include a housekeeping power supply. That is, in some instances, the adapter 508 may be in a low-power state (e.g., de-energized), such as when no second induction coil is present, and as such, the housekeeping power supply may provide or receive a low level of power to maintain basic or startup functionality. The current adjuster 512 may include other components. For example, the current adjuster 512 may include an input filter cap for filtering high frequency voltage ripple (e.g., from the DC provided by the power source 504). In addition, the current adjuster 512 may include a compensation capacitor or primary capacitor (e.g., to facilitate series-series compensation), which may help to align component resonance.

In additional examples, the wireless-charging adapter 508 may include one or more communication units 530 that enable, via a wireless communication link or channel, communication between the adapter 508 and one or more other local or remote computing devices via one or more protocols. For example, the adapter 508 may exchange communications with other devices in the environment 500 (e.g., the power supply 504 or the vehicle 502) and/or with remote devices (e.g., a remote teleoperation computing device). Communications may be exchanged via physical and/or logical interfaces. For example, the communication unit 530 may enable Wi-Fi-based communication such as via frequencies defined by the IEEE 802.11 standards, short range wireless frequencies (e.g., Bluetooth, Zigbee, etc.), cellular communication (e.g., 2G, 3G, 4G, 4G LTE, 5G, etc.), millimeter wave communications, satellite communication, dedicated short range communications (DSRC), or any suitable wired or wireless communications protocol that enables the respective computing device to interface with the other computing device(s). As such, in some examples, the adapter 508 (e.g., using the communication unit 530) may communicate directly with a vehicle (e.g., using the communication unit 534) or may communicate indirectly with the vehicle through a backend server (e.g., both the adapter 508 and the vehicle 502 communicate via cellular communication with the backend server, which facilitates message exchanges).

In one or more examples of the disclosure, the adapter 508 is connected to the power source 504 by mating an electrical connector 510 to the adapter 508. A DC that is provided by the power source 504 is received by the adapter 508. In some examples, the DC from the power source 504 may be a high voltage DC in a range of about 200V to about 5000V. The converter 522, based on inputs (e.g., control signals) from the gate driver(s) 524, changes the DC to an AC, and the AC is provided to the first induction coil 514 (and also possibly to the power supply 528). The first induction coil 514 may, as a result of the AC flow from the converter 522, provide wireless charging (e.g., non-contact power) to a second induction coil (e.g., via a Series Series-Resonant Inductive Power Transfer (SS-RIPT) link). In additional examples, the adapter 508 may monitor the provision of power to the second induction coil and may terminate the DC signal from the power source 504 based on various events. For example, the adapter 508 may detect a change in impedance (e.g., when the vehicle 502 having a second induction coil moves away from the adapter 508), and based on the change, terminate the DC (e.g., via the disconnect device or via signaling). In other examples, the adapter 508 may receive a signal from the vehicle 502 declining non-contact power (e.g., declining additional power such as when the power storage unit is sufficiently charged above a threshold).

As described above, prior to the vehicle being proximate adapter 508, the adapter 508 may include a low-power state (e.g., low power or no power). That is, before the vehicle is in position to wirelessly charge, even though the adapter 508 may be connected to the power source 504 (via the connector 510), the power source 504 may not provide the DC to the adapter 508, such that the first induction coil 514 is not receiving any AC (e.g., from the current adjuster 512). As such, aspects of this disclosure describe subject matter for determining that the vehicle is proximate the power source 504 and/or proximate the adapter 508 and/or for determining the second induction coil 516 is proximate the first induction coil. In addition, some aspects may, based on the determining, request DC from the power source 504 or otherwise trigger a transfer of DC from the DC fast charger to the adapter 508.

Figure 6:
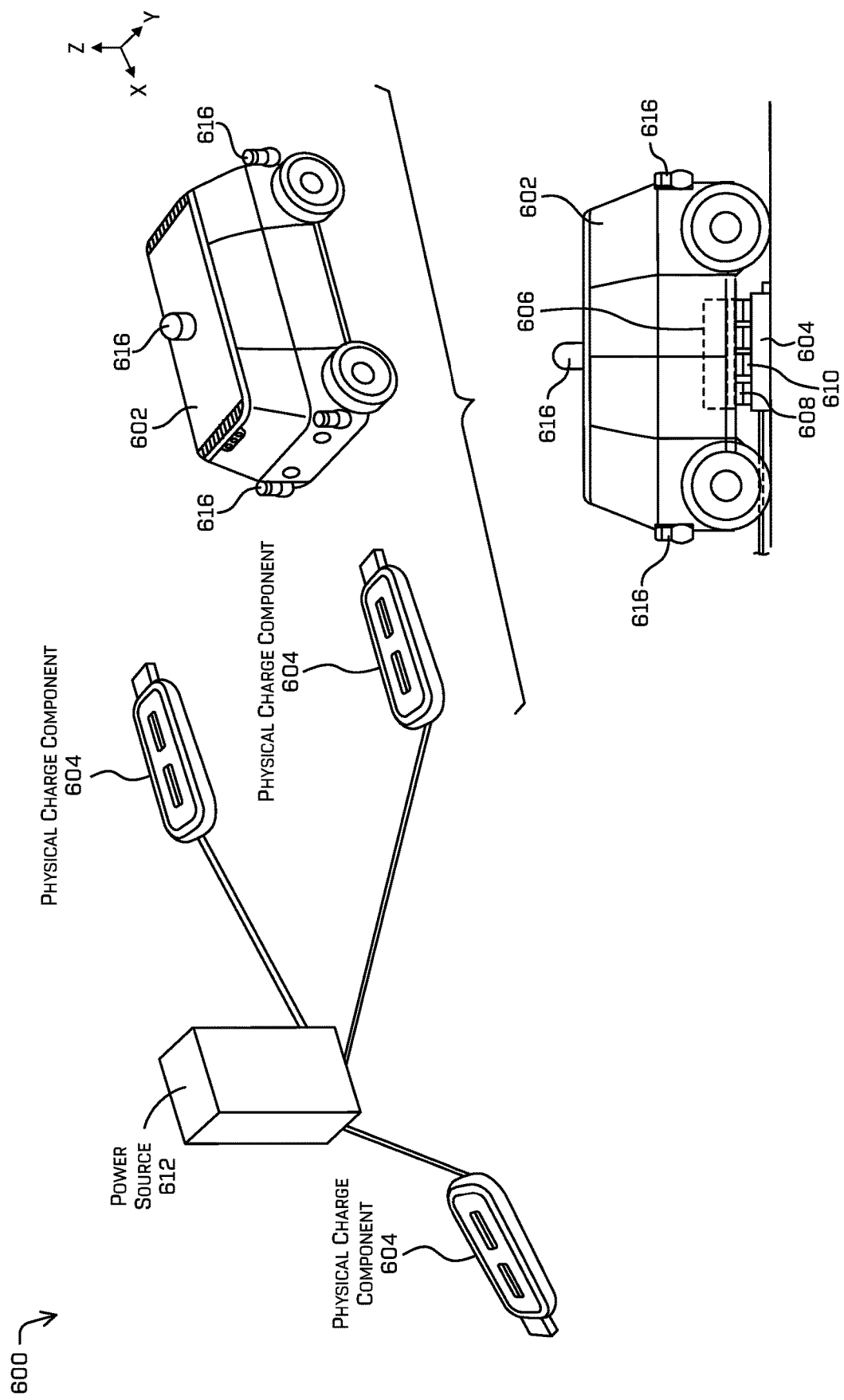
FIG. 6 is an example environment in which an example vehicle is maneuvering into position during an example recharging event with a physical connection.

FIG. 6 is an example environment 600 in which an example vehicle may maneuver into position during an example recharging event with a physical connection. The example vehicle 602 may be any configuration of vehicle, such as, for example, a van, a sport utility vehicle, a cross-over vehicle, a truck, a bus, an agricultural vehicle, and a construction vehicle. The vehicle 602 may be powered by one or more electric motors, one or more internal combustion engines, any combination thereof (e.g., by a hybrid power train), and/or any other suitable electric power sources. For the purpose of illustration, the example vehicle 602 is an at least partially electrically powered vehicle having two electrical propulsion units configured to provide the vehicle 602 with the ability to maneuver, each including a motor/inverter electrically coupled to one or more batteries configured to be recharged, as explained herein. For example, the vehicle 602 may be a bidirectional vehicle having a first drive module positioned in a front end and a second drive module positioned in a rear end. As used herein, a bidirectional vehicle is one that is configured to switch between traveling in a first direction of the vehicle and a second, opposite, direction of the vehicle. In other words, there is no fixed "front" or "rear" of the vehicle 602. In other examples, the techniques described herein may be applied to vehicles other than bidirectional vehicles. In some examples, the vehicle 602 may correspond to the vehicle as described with respect to FIGS. 1-4.

The example environment 600 is depicted with an X, Y, and Z coordinate frame. In some examples, the X-axis may correspond to a longitudinal direction of the vehicle 602, the Y-axis may correspond to a lateral direction of the vehicle 602, and/or the Z-axis may correspond to a vertical direction of the vehicle 602. Additionally, or alternatively, a ground and/or support surface may be disposed on the XY-plane of the coordinate frame, and the Z-axis may be configured perpendicular to the XY-plane.

An example of such techniques for maneuvering a vehicle into position during a recharging event with a physical contact charging connection are discussed in, for example, in U.S. patent application Ser. No. 16/214,826 titled "CHARGE COUPLER AND METHOD FOR AUTONOMOUSLY CHARGING VEHICLE BATTERIES" and filed Dec. 10, 2018, which is incorporated by reference herein in its entirety for all purposes.

As shown in FIG. 6, the example vehicle 602 may be configured to use a charging system for charging the one or more batteries coupled to the vehicle 602 and configured to provide electrical power for operation of the vehicle 602. The charging system may include a charging box 606 coupled to the vehicle 602 to facilitate electrical connection to a charge coupler 604 (e.g., also referred to herein as physical charge component) from under the vehicle 602. For example, charging box 606 may be configured to be electrically connected to the one or more batteries of the vehicle 602 to facilitate increasing a state of charge of the one or more of the batteries. In the example shown, the charging box 606 includes a case and interface electrical contacts 608, and the charge coupler 604 includes a housing and complimentary coupler electrical contacts 610 configured to electrically couple the charge coupler 604 to the charging box 606 to facilitate charging of the one or more batteries coupled to the vehicle 602. For example, each of the charging box 606 and charge coupler 604 may include positive, negative, and/or ground contacts configured to make electrical contact with one another, respectively, when the vehicle 602 is positioned such that the charging box 606 is positioned over (and substantially or loosely aligned with, as explained herein) the charge coupler 604, and the respective interface electrical contacts 608 and coupler electrical contacts 610 are brought into contact with one another, as explained herein. In some examples, the case of the charging box 606 may be formed from material configured to block electromagnetic interference. Although the interface electrical contacts 608 of the charging box 606 and the coupler electrical contacts 610 of the charge coupler 604 may be complimentary, they may not necessarily have a similar size and/or shape. The interface electrical contacts 608 of the charging box 606 and/or the coupler electrical contacts 610 of the charge coupler 604 may have various contact surface sizes and shapes. For example, the interface electrical contacts 608 and/or the coupler electrical contacts 610 may have circular, oblong, rectangular, square, polygonal, or the like contact surface shapes, for example, as described herein. In some examples, the interface electrical contacts 608 of the charging box 606 and the coupler electrical contacts 610 of the charge coupler 604 have substantially planar contact surfaces (e.g., planar within technical and/or manufacturing limits), for example, configured to provide respective complimentary planar contact surfaces for providing respective relatively large surface areas through which electrical current may flow. In some examples, the relatively larger surface areas may improve the speed and/or efficiency of the charging. In some examples, the interface electrical contacts 608 and/or the coupler electrical contacts 610 may be configured to be substantially or loosely aligned linearly along the longitudinal axis or the latitudinal axis of the vehicle 602. In some examples, the interface electrical contacts 608 associated with the charging box 606 may be larger (or larger in one dimension) than the coupler electrical contacts 610 of the charge coupler 604, or vice versa. In such examples, by oversizing one contact with respect to the other, the vehicle 602 need not exactly center the contacts with respect to one another. For example, if the interface electrical contacts 608 are ten centimeters larger in diameter than coupler electrical contacts 610, the vehicle 602 may move up to ten centimeters in any direction and still achieve substantially one hundred-percent contact.

The charge coupler 604 may be configured to be coupled to an electrical power source 612 and facilitate transfer of electrical power from the electrical power source 612 to the interface electrical contacts 608 of the charging box 606 when the interface electrical contacts 608 of the charging box 606 are brought into contact with the coupler electrical contacts 610 of the charge coupler 604. Additionally, or alternatively, the electrical power source 612 may be configured to provide power to one or more additional charge couplers 604 connected by respective connectors 614 (e.g., $2^{nd}$ physical charge component 604 and/or $3^{rd}$ physical charge component 604). While 3 charge couplers 604 are illustrated, any number of charge couplers 604 may be contemplated. In some examples, the electrical power source 612 may be any source of electrical power sufficient to supply electric power for charging batteries of an electrically powered vehicle, such as, for example, an electric vehicle charging station. As shown in FIG. 6, the charge coupler 604 may include a power cable coupled to an electrical connector 614 coupled to the charge coupler 604 and configured to be coupled to the electrical power source 612 to facilitate transfer of electrical power from the electrical power source 612 to the charge coupler 604. In some examples, the power cable may include one or more of a positive cable, a negative cable, and a ground cable. In some examples, the electrical connector 614 may be configured to transmit one or more of data or electrical power between the charge coupler 604 and the electrical power source 612, for example, via a standard electrical connection (e.g., a standard electrical connection and/or according to a standard protocol, such as, for example, SAE J1772-CCS1, CHAdeMO, IEC-type 2, or the like).

As explained in more detail herein, to increase the state of charge of the one or more batteries of the vehicle 602, the vehicle 602 may be maneuvered to a position over the charge coupler 604, such that the interface electrical contacts 608 of the charging box 606 under the vehicle 602 are substantially, or loosely, aligned with the coupler electrical contacts 610 of the charge coupler 604 (e.g., within geometric constraints of the contacts to optimize current flow). As explained herein, in some examples, the vehicle 602 may be an autonomous vehicle, and the charging system may include one or more markers that may be used by the vehicle 602 maneuver into the aligned position, for example, using a perception system including one or more sensors 616 to detect the one or more markers. In some examples, the marker(s) (e.g., fiducials) may include one or more of a physical marker (e.g., having a LIDAR reflective surface), an optical marker (e.g., a QR code, an AR tag, or the like), an RFID tag, an RF beacon. In some examples, vehicle sensors, including Wi-Fi receivers, lidar, image sensors (such as cameras), radar, time-of-flight sensors, etc., may be used to localize the vehicle 602 using a simultaneous localization and mapping (SLAM) algorithm.

For example, the vehicle 602 may be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 602 may be configured to control all functions from start to completion of the trip, including all parking functions, it may not include a driver and/or controls for driving the vehicle 602, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

Although the example vehicle 602 has four wheels, the systems and methods described herein may be incorporated into vehicles having fewer or a greater number of wheels, tires, and/or tracks. The example vehicle 602 may have four-wheel steering and may operate generally with equal performance characteristics in all directions, for example, such that a first end of the vehicle 602 is the front end of the vehicle 602 when travelling in a first direction, and such that the first end becomes the rear end of the vehicle 602 when traveling in the opposite, second direction. Similarly, a second end of the vehicle 602 is the front end of the vehicle 602 when travelling in the second direction, and such that the second end becomes the rear end of the vehicle 602 when traveling in the opposite, first direction. These example characteristics may facilitate greater maneuverability, for example, in small spaces or crowded environments, such as parking lots and urban areas.

The vehicle 602 may travel through the environment 600, relying at least in part on sensor data indicative of objects in the environment 600 in order to determine trajectories of the vehicle 602. For example, as the vehicle 602 travels through the environment 600, one or more of the sensors 616 capture data associated with detected objects (e.g., vehicles, pedestrians, buildings, barriers, etc.). The sensors 616 may include one of more image capture devices, one or more LIDAR sensors, one or more SONAR sensors, one or more RADAR sensors, or the like. The data captured by the one or more sensors 616 may be used, for example, as input for determining trajectories for the vehicle 602 (e.g., which may be used for aligning the vehicle 602 over the charge coupler 604).

Once positioned and aligned over the charge coupler 604, the interface electrical contacts 608 of the charging box 606 and the coupler electrical contacts 610 of the charge coupler 604 may be brought into contact with one another, as explained herein, so that electrical power supplied by the electrical power source 612 may flow through the power cable to the coupler electrical contacts 610 of the charge coupler 604 and to the interface electrical contacts 608 of the charging box 606. The interface electrical contacts 608 of the charging box 606 may be electrically connected to the one or more batteries of the vehicle 602, and the state of charge of one or more of the batteries may be increased, for example, as explained in more detail herein. By providing the interface electrical contacts 608 of the charging box 606 coupled to the vehicle 602, so that they are accessible from the underside of the vehicle 602, unintended contact with a person may be prevented. As explained in more detail herein, some examples of the charging system may be configured such that the coupler electrical contacts 610 of the charge coupler 604 may not be energized unless the vehicle 602 is in position over the charge coupler 604, thereby preventing unintended contact with a person when the coupler electrical contacts 610 of the charge coupler 604 are energized. As a result, the interface electrical contacts 608 of the charging box 606 and/or the coupler electrical contacts 610 of the charge coupler 604 may have a relatively large and robust contact surface area to increase the useful service life of the electrical contacts 608 and/or 610. In some examples, though not illustrated in FIG. 6, a physical barrier, which may or may not be formed from a conductive material (e.g., for EMI considerations) and which may be formed from a resilient (e.g., compliant) material may form a gasket around the connection from the bottom surface of vehicle 602 to the ground such that living being (human, animal, etc.) may not inadvertently make contact while the vehicle 602 is charging. As explained in detail below, a housing and/or opening mechanisms on the charge coupler 604 may provide further safety considerations by preventing the coupler electrical contacts 610 from being exposed when not in use (e.g., for example, when not engaged with the charging box 606).

In some examples, the interface electrical contacts 608 of the charging box 606 may be generally exposed as viewed from the underside of the vehicle 602. As a result, the interface electrical contacts 608 of the charging box 606 may become soiled with dirt, sand, salt, oil, and/or other grit resulting from travel on the road. Some examples of the charging system may include cleaning device configured to reduce or remove such substances from the interface electrical contacts 608 of the charging box 606. For example, the cleaning device may be configured to be positioned on the support surface on which the vehicle 602 travels, so that as the vehicle 602 passes over the cleaning device, the cleaning device reduces or removes substances from the surface(s) of the interface electrical contacts 608 of the charging box 606. As several non-limiting examples, the cleaning device may deliver streams of one or more of air, water, steam, cleaning solvents, and the like to the underside of the vehicle 602 to remove debris, etc. Furthermore, such solvents may additionally, or alternatively, include compounds to remove rust, prevent corrosion, or otherwise ensure electrical connections with the interface electrical contacts 608 are optimized. This may improve physical contact between the interface electrical contacts 608 of the charging box 606 and the coupler electrical contacts 610 of the charge coupler 604, and/or prolong the useful service life of the electrical contacts 608 and/or 610. Although the cleaning device may be physically separate from the vehicle 602, in some examples, the cleaning device may be coupled to the vehicle 602. In some examples, the cleaning device may be coupled to the charge coupler 604 or may take the form of an automated service robot. In some examples, the coupler electrical contacts 610 may not be energized, for example, when charging is not occurring to increase the safety associated with the charge coupler 604 and/or to reduce safety concerns when debris is being removed from the coupler electrical contacts 610.

The charging system may also include an anchor associated with the support surface on which the charge coupler 604 is positioned and configured to selectively hold the charge coupler 604 in position. For example, the charge coupler 604 may be intended to be either portable or fixed in location on the support surface, and the anchor may be configured to selectively secure the charge coupler 604 in a fixed position or permit its repositioning using, for example, known securement assemblies, such as fasteners, clamps, etc.

FIGS. 1, 2, 7, and 8 illustrate example processes in accordance with examples of the disclosure. These process(es) are illustrated as a logical flow graph, each operation of which represents a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be omitted or combined in any order and/or in parallel to implement the processes.

Figure 7:
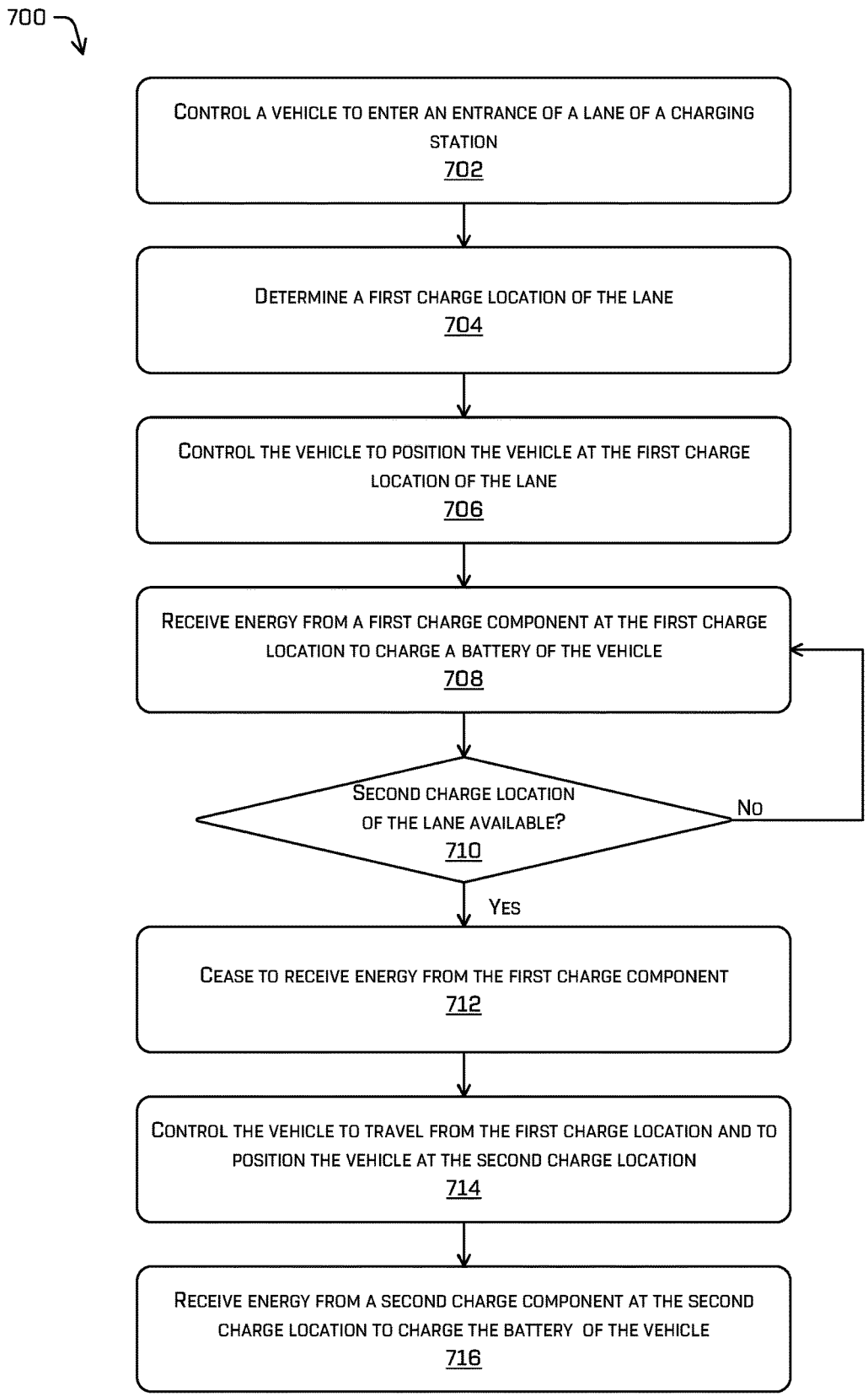
FIG. 7 is an example process for controlling a vehicle navigating a dense charging station.

FIG. 7 is an example process 700 for controlling a vehicle navigating a dense charging station. For example, some or all of the process 700 may be performed by one or more components in FIG. 9, as described herein. For example, some or all of the process 700 may be performed by the charging station controller 938, the charging coordination component 940, the navigation component 942, the battery component 944, and/or the vehicle 902.

At operation 702, the process 700 may include controlling the vehicle to enter an entrance of a lane of a charging station. In some examples, the vehicle may correspond to the vehicle(s) 116 and/or 408 as described with respect to FIGS. 1 & 4. Additionally, or alternatively, the charging station may correspond to the charging station(s) 108 and/or 400 as described with respect to FIGS. 1 & 4.

At operation 704, the process 700 may include determining a first charge location of the lane. In some examples, the first charge location may be determined via one or more sensor(s) associated with the vehicle. Additionally, or alternatively, the first charge location may be determined via a charging station coordinator and sent to the vehicle.

At operation 706, the process 700 may include controlling the vehicle to position the vehicle at the first charge location of the lane. In some examples, the vehicle may use the one or more sensors to position itself at the first charge location of the lane. Additionally, or alternatively, the charging station coordinator may send an instruction to the vehicle to control the vehicle and position the vehicle at the first charge location.

At operation 708, the process 700 may include receiving energy from a first charge component at the first charge location to charge a battery of the vehicle. In some examples, the first charge component may be configured as a wireless charge component, and the battery may begin receiving the energy upon positioning the vehicle at the first charge location without additional action. Additionally, or alternatively, the first charge component may be configured as physical charge component, and the vehicle may be further controlled (e.g., controlling a suspension system of the vehicle as described with respect to FIG. 6) such that a physical charge component of the vehicle contacts a physical charge component at the first charge location and the battery may begin receiving energy upon contact of the separate charge components (e.g., the vehicle component contacting the station component).

At operation 710, the process 700 may include determining whether a second charge location of the lane is available. In some examples, the second charge location may be positioned closer to an exit of the lane than the first charge location. In some examples, the vehicle may use data captured by the one or more sensors to determine whether the second charge location of the lane is available. Additionally, or alternatively, the charging station coordinator may send an indication that the second charge location of the lane is available to the vehicle. If the process 700 determines that the second charge location of the lane is unavailable, the process 700 may return to operation 708 to continue receiving energy from the first charge component at the first charge location. Alternatively, if the process 700 determines that the second charge location of the lane is available, the process 700 may proceed to operation 712.

At operation 712, the process 700 may include ceasing to receive energy from the first charge component. In some examples, ceasing to receive the energy from the first charge component may be based at least in part on determining that the second charge location is available. In some examples, ceasing to receive the energy from the first charge component may be a result of the vehicle moving away from the position at the first charge location. Additionally, or alternatively, a suspension system of the vehicle may be controlled to raise a physical charge component of the vehicle away from a charge component at the first charge location to cease receiving the energy.

At operation 714, the process 700 may include controlling the vehicle to travel from the first charge location and to position the vehicle at the second charge location. In some examples, the vehicle may use the one or more sensors to position itself at the second charge location of the lane. Additionally, or alternatively, the charging station coordinator may send an instruction to the vehicle to control the vehicle and position the vehicle at the second charge location.

At operation 716, the process 700 may include receiving energy from a second charge component at the second charge location to charge the battery of the vehicle. In some examples, the second charge component may be configured as a wireless charge component, and the battery may begin receiving the energy upon positioning the vehicle at the second charge location without additional action. Additionally, or alternatively, the second charge component may be configured as physical charge component, and the vehicle may be further controlled (e.g., controlling a suspension system of the vehicle as described with respect to FIG. 6) such that a physical charge component of the vehicle contacts a physical charge component at the second charge location and the battery may begin receiving energy upon contact of the separate charge components (e.g., the vehicle component contacting the station component).

In some examples, the process 700 may include determining that a charge level of the battery satisfies a first threshold charge level. Additionally, or alternatively, the process 700 may include determining a state of the first charge location of the lane, the state indicating that the first charge location of the lane is at least one of available or occupied by another vehicle. Additionally, or alternatively, the process 700 may include based at least in part on the state of the first charge location, one of controlling the vehicle to remain at the second charge location until the charge level of the battery satisfies a second threshold charge level, where the second threshold charge level may be greater than the first threshold charge level, or travel from the second charge location to the exit of the lane.

In some examples, the lane may be a first lane, and the first lane may be associated with a first range of vehicle charge states. Additionally, or alternatively, the process 700 may include determining a current charge state of the battery of the vehicle. Additionally, or alternatively, the process 700 may include determining that the current charge state of the battery is within one of the first range of vehicle charge states or a second range of vehicle charge states associated with a second lane of the charging station. Additionally, or alternatively, the process 700 may include controlling the vehicle to enter the entrance of the first lane based at least in part on determining that the current charge state of the battery is within the first range of vehicle charge states. Additionally, or alternatively, the process 700 may include controlling the vehicle to enter an entrance of the second lane based at least in part on determining that the current charge state of the battery is within the second range of vehicle charge states.

In some examples, the lane may be a first lane. Additionally, or alternatively, the process 700 may include determining a current charge state of the battery of the vehicle. Additionally, or alternatively, the process 700 may include determining, via one or more sensors associated with the vehicle, a first estimated charge time associated with the first lane based at least in part on a number of vehicles occupying the first lane and a number of charge locations disposed in the first lane. Additionally, or alternatively, the process 700 may include determining, via the one or more sensors, a second estimated charge time associated with a second lane of the charging station based at least in part on a number of vehicles occupying the second lane and a number of charge locations disposed in the second lane. Additionally, or alternatively, the process 700 may include controlling the vehicle to enter the entrance of the first lane or an entrance of the second lane based at least in part on the current charge state of the battery, the first estimate charge time, and the second estimated charge time.

In some examples, the first charge component may comprise a first induction coil. Additionally, or alternatively, the process 700 may include receiving a signal indicating the first induction coil of the first charge location is proximate to a second induction coil of the vehicle. Additionally, or alternatively, the process 700 may include transmitting, by a microcontroller and based at least partly on the signal being received, a message to a direct current (DC) fast charger pursuant to a signaling protocol. Additionally, or alternatively, the process 700 may include receiving, from the DC fast charger, a DC. Additionally, or alternatively, the process 700 may include converting the DC to an alternating current (AC). Additionally, or alternatively, the process 700 may include transmitting the AC to the first induction coil to induce a current in the second induction coil of the vehicle. Additionally, or alternatively, the process 700 may include receiving the energy from the first charge component based at least in part on inducing the current in the second induction coil of the vehicle.

Figure 8:
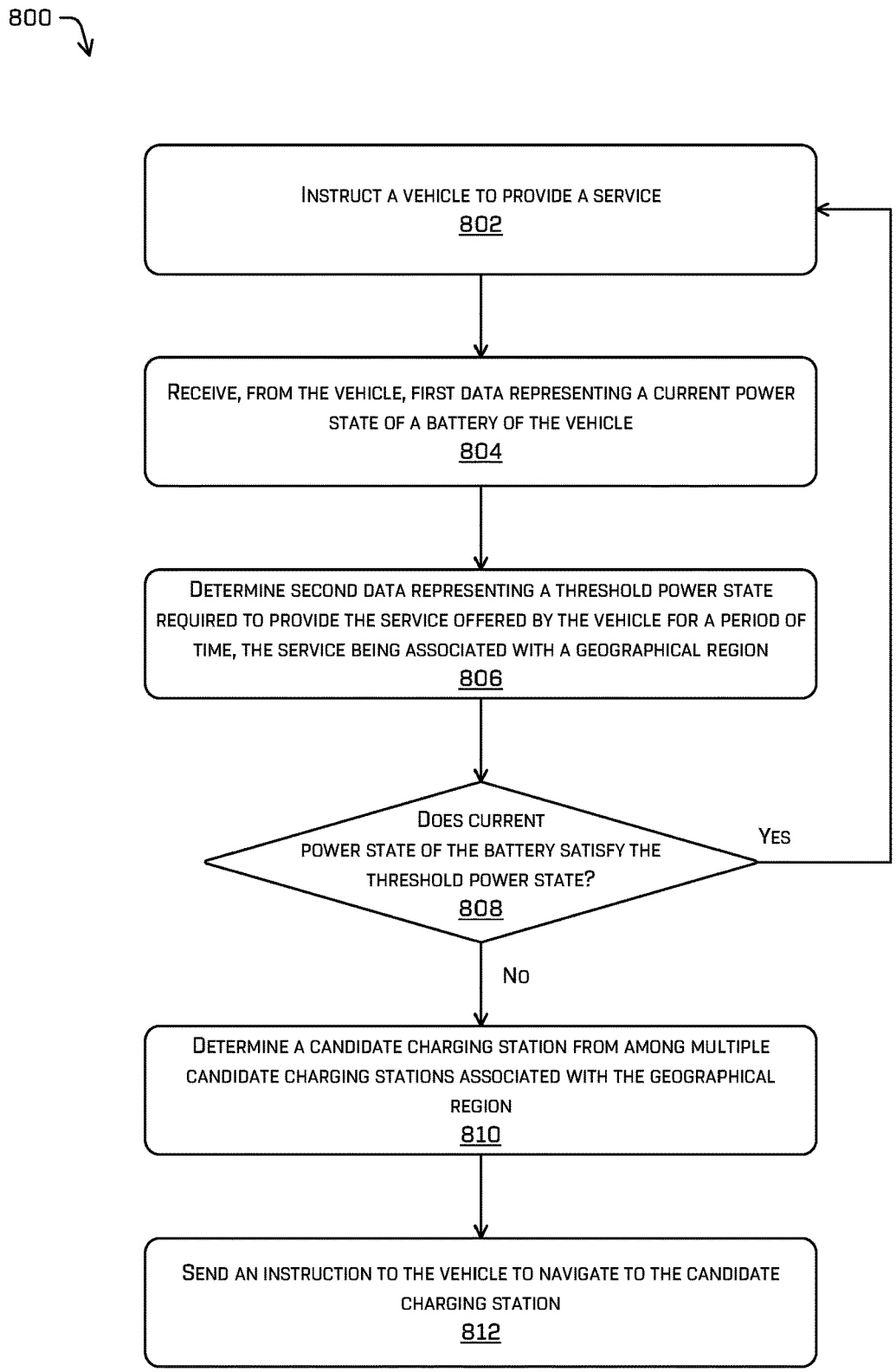
FIG. 8 is an example process for determining when to charge a battery of a service vehicle.

FIG. 8 is an example process 800 for determining when to charge a battery of a service vehicle. For example, some or all of the process 800 may be performed by one or more components in FIG. 9, as described herein. For example, some or all of the process 800 may be performed by the charging station controller 938, the charging coordination component 940, the navigation component 942, and/or the battery component 944, and/or the vehicle 902.

At operation 802, the process 800 may include instructing a vehicle to provide a service. In some examples, the vehicle may be included in a fleet of vehicles configured to provide the service. Additionally, or alternatively, the service may be a first service of multiple services that the vehicle is configured to provide.

At operation 804, the process 800 may include receiving, from the vehicle, first data representing a current power state of a battery of the vehicle. In some examples, the vehicle may send the first data to a charging coordinator, such as the charging coordinator as described with respect to FIGS. 2 and 4. Additionally, or alternatively, a computing system associated with vehicle (either onboard or at a backend server) may receive the first data.

At operation 806, the process 800 may include determining second data representing a threshold power state required to provide a service offered by the vehicle. In some examples, the service may be offered by the vehicle for a period of time. In some examples, the service may be associated with a geographical region. As described herein, the second data representing the threshold power state may be determined based on various factors, such as, but not limited to, a type of the vehicle, a type of service that the vehicle is providing, an estimated demand for providing the service, a number of additional vehicles providing the service, the amount of time in which the vehicle is providing the service.

At operation 808, the process 800 may include determining whether the current power state of the vehicle satisfies the threshold power state required to provide the service offered by the vehicle for the period of time. If the process 800 determines that the current power state of the vehicle satisfies the threshold power state required to provide the service for the period of time, the process 800 may return to operation 802 to continue instructing the vehicle to provide the service. Alternatively, if the process 800 determines that the current power state of the vehicle does not satisfy the threshold power state required to provide the service for the period of time, the process 800 may proceed to operation 810.

At operation 810, the process 800 may include determining a candidate charging station from among multiple charging stations associated with the geographical region. In some examples, determining the candidate charging station may be based at least in part on determining that the current power state does not satisfy the threshold power state required for providing the service for the period of time. Additionally, or alternatively, various factors may be considered when determining the candidate charging station, such as, for example, a distance from the vehicle to the charging station, a number of available charging positions at the charging station, an estimated charge time, a predicted level of demand, and the like. In some examples, one factor may be prioritized over another. For example, a first charging station may be located the shortest distance from the vehicle, but may have a first estimated charge time that is longer than a second estimated charge time associated with a second charging station that is located a further distance from the vehicle. However, the system may make a determination that the additional distance to travel to the second charging station is less severe than the additional estimated charge time associated with the first charging station. As such, the system may determine the second charging station as the candidate charging station.

At operation 812, the process 800 may include sending an instruction to the vehicle to navigate to the candidate charging station. Additionally, or alternatively, the vehicle may determine navigation instructions from a current position of the vehicle to the candidate charging station.

In some examples, determining the candidate charging station may be based at least in part on a distance of the candidate charging station from a current location of the vehicle, a number of available charge positions at the candidate charging station, an estimated time to charge the battery of the vehicle at the candidate charging station, and/or a predicted demand for the candidate charging station.

In some examples, determining the second data representing the threshold powers state required to provide the service offered by the vehicle for the period of time may be based at least in part on at least one of a number of additional vehicles available to provide the service, a size of the geographical region, and/or a current or predicted level of demand associated with the service.

In some examples, the service may be a first service, and the threshold power state may be a first threshold power state. Additionally, or alternatively, the process 800 may include identifying a second service offered by the vehicle, the second service being different from the first service. Additionally, or alternatively, the process 800 may include determining third data representing a second threshold power state to provide the second service for the period of time. Additionally, or alternatively, the process 800 may include determining that the current power state of the battery satisfies the second threshold power state to provide the second service. Additionally, or alternatively, the process 800 may include instructing the vehicle to provide the second service.

In some examples, the candidate charging station may be a first candidate charging station, and the first candidate charging station may be a first distance from the vehicle. Additionally, or alternatively, the process 800 may include determining a second candidate charging station from among the multiple charging stations. In some examples, the second candidate charging station may be a second distance from the vehicle. In some examples, the second distance may be less than the first distance. Additionally, or alternatively, the process 800 may include determining a first estimated time of arrival associated with first candidate charging station based at least in part on the first distance. Additionally, or alternatively, the process 800 may include determining a second estimated time of arrival associated with the second candidate charging station based at least in part on the second distance. Additionally, or alternatively, the process 800 may include determining third data associated with the first candidate charging station. In some examples, the third data may represent a first predicted level of demand at the first estimated time of arrival, the first predicted level of demand being associated with the first candidate charging station. Additionally, or alternatively, the process 800 may include determining fourth data associated with a second candidate charging station. In some examples, the fourth data may represent a second predicted level of demand at the second estimated time of arrival, the second predicted level of demand being associated with the second candidate charging station. Additionally, or alternatively, the process 800 may include determining that the first predicted level of demand is lower than the second predicted level of demand. Additionally, or alternatively, the process 800 may include sending the instruction to the vehicle to travel to the first candidate charging station based at least in part on determining that the first predicted level of demand is lower than the second predicted level of demand.

Figure 9:
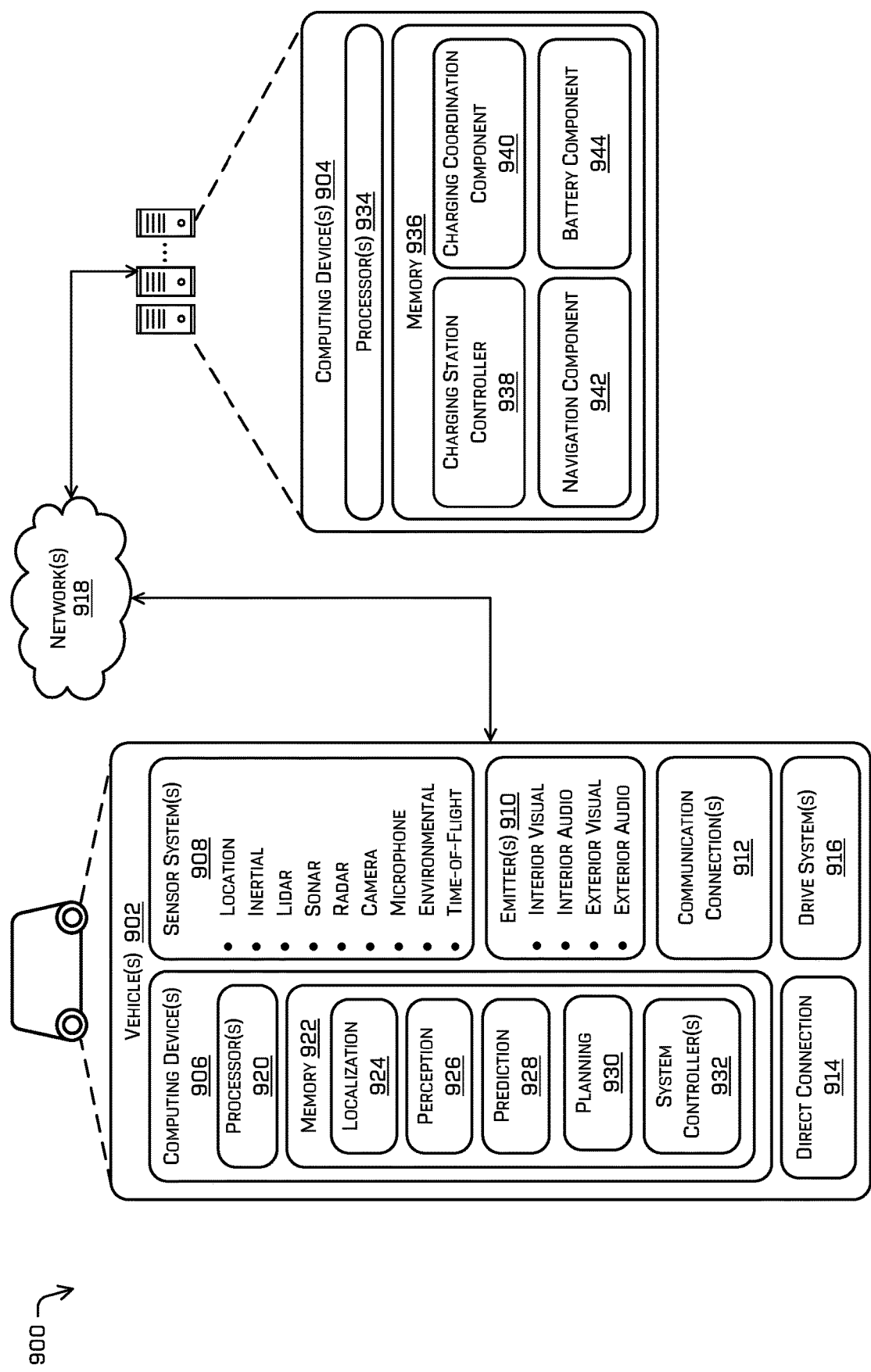
FIG. 9 is a block diagram of an example system for implementing the techniques described herein.

FIG. 9 depicts a block diagram of an example system 900 for implementing the techniques discussed herein. In at least one example, the system 900 can include one or more vehicles 902, and one or more computing devices 904. In some examples, the computing devices 904 may correspond to an autonomous vehicle simulation system configured to communicate with vehicle(s) 902 to generate, execute, and evaluate driving simulations. The vehicle(s) 902 may include various software-based and/or hardware-based components of autonomous vehicles, and may be used to control autonomous vehicles traversing through physical environments and/or simulated vehicles operating within driving simulations. In some cases, the vehicle(s) 902 may correspond to a vehicle traversing a physical environment, capturing and storing log data which may be provided to a simulation system. Additionally, or alternatively, the vehicle(s) 902 may correspond to a simulated vehicle operating within a driving simulation, as one or more separate vehicle control systems, interacting with and being evaluated by a simulation system during a driving simulation.

In at least one example, the vehicle 902 may correspond to an autonomous or semi-autonomous vehicle configured to perform object perception and prediction functionality, route planning and/or optimization. The example vehicle 902 can be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 902 can be configured to control all functions from start to completion of the trip, including all parking functions, it may not include a driver and/or controls for driving the vehicle 902, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The vehicle(s) 902 can include a computing device(s) 906, one or more sensor system(s) 908, one or more emitter(s) 910, one or more communication connection(s) 912 (also referred to as communication devices and/or modems), at least one direct connection 914 (e.g., for physically coupling with the vehicle(s) 902 to exchange data and/or to provide power), and one or more drive system(s) 916. The one or more sensor system(s) 908 can be configured to capture sensor data associated with an environment.

The sensor system(s) 908 can include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The sensor system(s) 908 can include multiple instances of each of these or other types of sensors. For instance, the time-of-flight sensors can include individual time-of-flight sensors located at the corners, front, back, sides, and/or top of the vehicle(s) 902. As another example, the camera sensors can include multiple cameras disposed at various locations about the exterior and/or interior of the vehicle(s) 902. The sensor system(s) 908 can provide input to the computing device(s) 906.

The vehicle(s) 902 can also include one or more emitter(s) 910 for emitting light and/or sound. The one or more emitter(s) 910 in this example include interior audio and visual emitters to communicate with passengers of the vehicle(s) 902. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The one or more emitter(s) 910 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle(s) 902 can also include one or more communication connection(s) 912 that enable communication between the vehicle(s) 902 and one or more other local or remote computing device(s) (e.g., a remote teleoperations computing device) or remote services. For instance, the communication connection(s) 912 can facilitate communication with other local computing device(s) on the vehicle(s) 902 and/or the drive system(s) 916. Also, the communication connection(s) 912 can allow the vehicle(s) 902 to communicate with other nearby computing device(s) (e.g., other nearby vehicles, traffic signals, etc.).

The communications connection(s) 912 can include physical and/or logical interfaces for connecting the computing device(s) 906 to another computing device or one or more external network(s) 918 (e.g., the Internet). For example, the communications connection(s) 912 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s). In at least some examples, the communication connection(s) 912 may comprise the one or more modems as described in detail above.

In at least one example, the vehicle(s) 902 can include one or more drive system(s) 916. In some examples, the vehicle(s) 902 can have a single drive system 916. In at least one example, if the vehicle(s) 902 has multiple drive systems 916, individual drive systems 916 can be positioned on opposite ends of the vehicle(s) 902 (e.g., the front and the rear, etc.). In at least one example, the drive system(s) 916 can include one or more sensor system(s) 908 to detect conditions of the drive system(s) 916 and/or the surroundings of the vehicle(s) 902. By way of example and not limitation, the sensor system(s) 908 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 916. In some cases, the sensor system(s) 908 on the drive system(s) 916 can overlap or supplement corresponding systems of the vehicle(s) 902 (e.g., sensor system(s) 908).

The drive system(s) 916 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 916 can include a drive system controller which can receive and preprocess data from the sensor system(s) 908 and to control operation of the various vehicle systems. In some examples, the drive system controller can include one or more processor(s) and memory communicatively coupled with the one or more processor(s). The memory can store one or more modules to perform various functionalities of the drive system(s) 916. Furthermore, the drive system(s) 916 also include one or more communication connection(s) that enable communication by the respective drive system with one or more other local or remote computing device(s).

The computing device(s) 906 can include one or more processor(s) 920 and memory 922 communicatively coupled with the one or more processor(s) 920. In the illustrated example, the memory 922 of the computing device(s) 906 stores a localization component 924, a perception component 926, a prediction component 928, a planning component 930, and one or more system controller(s) 932. Though depicted as residing in the memory 922 for illustrative purposes, it is contemplated that the localization component 924, the perception component 926, the prediction component 928, the planning component 930, and the one or more system controller(s) 932 can additionally, or alternatively, be accessible to the computing device(s) 906 (e.g., stored in a different component of vehicle(s) 902 and/or be accessible to the vehicle(s) 902 (e.g., stored remotely).

In memory 922 of the computing device(s) 906, the localization component 924 can include functionality to receive data from the sensor system(s) 908 to determine a position of the vehicle(s) 902. For example, the localization component 924 can include and/or request/receive a three-dimensional map of an environment and can continuously determine a location of the autonomous vehicle within the map. In some instances, the localization component 924 can use SLAM (simultaneous localization and mapping) or CLAMS (calibration, localization and mapping, simultaneously) to receive time-of-flight data, image data, lidar data, radar data, sonar data, IMU data, GPS data, wheel encoder data, or any combination thereof, and the like to accurately determine a location of the autonomous vehicle. In some instances, the localization component 924 can provide data to various components of the vehicle(s) 902 to determine an initial position of an autonomous vehicle for generating a trajectory, as discussed herein.

The perception component 926 can include functionality to perform object detection, segmentation, and/or classification. In some examples, the perception component 926 can provide processed sensor data that indicates a presence of an entity that is proximate to the vehicle(s) 902 and/or a classification of the entity as an entity type (e.g., car, pedestrian, cyclist, building, tree, road surface, curb, sidewalk, unknown, etc.). In additional and/or alternative examples, the perception component 926 can provide processed sensor data that indicates one or more characteristics (also referred to as parameters) associated with a detected entity and/or the environment in which the entity is positioned. In some examples, characteristics associated with an entity can include, but are not limited to, an x-position (global position), a y-position (global position), a z-position (global position), an orientation, an entity type (e.g., a classification), a velocity of the entity, an extent of the entity (size), etc. Characteristics associated with the environment can include, but are not limited to, a presence of another entity in the environment, a state of another entity in the environment, a time of day, a day of a week, a season, a weather condition, a geographic position, an indication of darkness/light, etc.

The perception component 926 can include functionality to store perception data generated by the perception component 926. In some instances, the perception component 926 can determine a track corresponding to an object that has been classified as an object type. For purposes of illustration only, the perception component 926, using sensor system(s) 908 can capture one or more images of an environment. The sensor system(s) 908 can capture images of an environment that includes an object, such as a pedestrian. The pedestrian can be at a first position at a time T and at a second position at time T+t (e.g., movement during a span of time t after time T). In other words, the pedestrian can move during this time span from the first position to the second position. Such movement can, for example, be logged as stored perception data associated with the object.

The stored perception data can, in some examples, include fused perception data captured by the vehicle. Fused perception data can include a fusion or other combination of sensor data from sensor system(s) 908, such as image sensors, lidar sensors, radar sensors, time-of-flight sensors, sonar sensors, global positioning system sensors, internal sensors, and/or any combination of these. The stored perception data can additionally or alternatively include classification data including semantic classifications of objects (e.g., pedestrians, vehicles, buildings, road surfaces, etc.) represented in the sensor data. The stored perception data can additionally or alternatively include a track data (collections of historical positions, orientations, sensor features, etc. associated with the object over time) corresponding to motion of objects classified as dynamic objects through the environment. The track data can include multiple tracks of multiple different objects over time. This track data can be mined to identify images of certain types of objects (e.g., pedestrians, animals, etc.) at times when the object is stationary (e.g., standing still) or moving (e.g., walking, running, etc.). In this example, the computing device determines a track corresponding to a pedestrian.

The prediction component 928 can generate one or more probability maps representing prediction probabilities of possible locations of one or more objects in an environment. For example, the prediction component 928 can generate one or more probability maps for vehicles, pedestrians, animals, and the like within a threshold distance from the vehicle(s) 902. In some instances, the prediction component 928 can measure a track of an object and generate a discretized prediction probability map, a heat map, a probability distribution, a discretized probability distribution, and/or a trajectory for the object based on observed and predicted behavior. In some instances, the one or more probability maps can represent an intent of the one or more objects in the environment.

The planning component 930 can determine a path for the vehicle(s) 902 to follow to traverse through an environment. For example, the planning component 930 can determine various routes and paths and various levels of detail. In some instances, the planning component 930 can determine a route to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 930 can generate an instruction for guiding the autonomous vehicle along at least a portion of the route from the first location to the second location. In at least one example, the planning component 930 can determine how to guide the autonomous vehicle from a first waypoint in the sequence of waypoints to a second waypoint in the sequence of waypoints. In some examples, the instruction can be a path, or a portion of a path. In some examples, multiple paths can be substantially simultaneously generated (i.e., within technical tolerances) in accordance with a receding horizon technique. A single path of the multiple paths in a receding data horizon having the highest confidence level may be selected to operate the vehicle.

In other examples, the planning component 930 can alternatively, or additionally, use data from the perception component 926 to determine a path for the vehicle(s) 902 to follow to traverse through an environment. For example, the planning component 930 can receive data from the perception component 926 regarding objects associated with an environment. Using this data, the planning component 930 can determine a route to travel from a first location (e.g., a current location) to a second location (e.g., a target location) to avoid objects in an environment. In at least some examples, such a planning component 930 may determine there is no such collision free path and, in turn, provide a path which brings vehicle(s) 902 to a safe stop avoiding all collisions and/or otherwise mitigating damage.

In at least one example, the computing device(s) 906 can include one or more system controller(s) 932, which can be configured to control steering, propulsion, braking, safety, emitters, communication, and other systems of the vehicle(s) 902. These system controller(s) 932 can communicate with and/or control corresponding systems of the drive system(s) 916 and/or other components of the vehicle(s) 902, which may be configured to operate in accordance with a path provided from the planning component 930.

The vehicle(s) 902 can connect to one or more external computing device(s) 904 via network(s) 918. Computing device(s) 904 can include one or more processor(s) 934 and memory 936 communicatively coupled with the one or more processor(s) 934. In at least one instance, the one or more processor(s) 934 can be similar or identical to the processor(s) 920 and the memory 936 can be similar or identical to the memory 922. In the illustrated example, the memory 936 of the computing device(s) 904 stores a charging station controller 938, a charging coordination component 940, a navigation component 942, and/or a battery component 944. In various example, one or more of the components within the memory 936 of the computing device(s) 904 may be combined, and/or the functionality of any components may be executed within other component(s) in other implementations. Additionally although depicted as residing in the memory 936 for illustrative purposes, it is contemplated that any or all of the charging station controller 938, the charging coordination component 940, the navigation component 942, and/or the battery component 944 can, additionally or alternatively, be remotely accessible to the vehicle(s) 902 and/or the computing device(s) 904. For instance, any or all of the components within the computing device(s) 904 can be stored in a different component of computing device(s) 904, stored on the vehicle(s) 902, and/or stored remotely and accessible to the vehicle(s) 902 and computing device(s) 904 via one or more networks 918.

In memory 936 of the computing device(s) 904, the charging station controller 938 may include functionality to control a vehicle navigating through a dense charging station, such as the vehicle(s) 116, 408 navigating the charging station(s) 108, 400, as described with respect to FIGS. 1 and 4, respectively. Given the dense nature of the charging stations, navigating a vehicle through a charging station may require precise control of the vehicle and awareness of events happening around the vehicle. As such, a universal charging station controller 938 and/or individual charging station controllers 938 for each charging station may be employed to maximize charging optimization and avoid congestion at a charging station caused by one or more vehicles. In some examples, a vehicle, such as an autonomous vehicle, may be configured to control the vehicle utilizing the charging station. Additionally, or alternatively, the charging station controller 938 may be configured to transmit instructions to a vehicle utilizing the charging station. In some examples, the instructions may comprise commands to utilize data gathered from sensors associated with the vehicle, causing the vehicle to travel from a current position to a target position, and/or causing the vehicle and/or a battery of the vehicle to receive a flow of energy from a charge component of the charge station.

In some examples, the charging station controller 938, may be configured to communicate with the charging coordination component 940 and send data representing indications of available charging positions, a number of vehicles at the charging station, an estimated charge time associated with the charging station, and the like. Additionally, or alternatively, the charging station controller 938 may be configured to communicate the data directly with one or more vehicles configured to utilize the charging station. Further, the charging station controller 938 may be configured to control a vehicle using an associated charging station. In some examples, the charging station controller 938 may send indications of available charge locations, instructions to navigate to a subsequent charge location, or the like to a vehicle.

In some examples, the charging coordination component 940 may be configured to manage a fleet of vehicles to coordinate a dynamic charging schedule of the vehicles. Given the high number of vehicles potentially servicing a geographic area and the limited area utilized for a dense charging location, providing multiple charging stations, determining an optimal time to charge a battery of a vehicle from a fleet of vehicles providing a service, and identifying the most suitable charging station of the multiple charging stations for charging the battery may require data specific to each individual charging station and/or vehicle a fleet of vehicles from providing a service. As such, the charging coordination component 940 may be configured to manage a fleet of vehicles using a centralized charging coordinator to coordinate a dynamic charging schedule of the vehicles may be employed to determine if a current charge state of a vehicle battery satisfies a threshold charge state for providing the service, among other various determinations to decide an optimal time to remove the vehicle from providing the service to charge the battery of the vehicle. In some examples, the charging coordination component 940 may receive data from the charging station controller(s) 938 representing various indications of states of charging stations associated with a geographic region.

In some examples, the charging coordination component 940 may be configured to determine when to remove a vehicle from providing a service for a geographic region. In some examples, the charging coordination component 940 may receive data from one or more vehicles of the fleet, such as, for example, data representing a current power state of a battery of the vehicle. The charging coordination component 940 may then determine if the current power state of the battery satisfies a threshold power state required for providing a service for a period of time. In some examples, the threshold power state for providing the service may be determined based on various factors, such as, but not limited to, a type of the vehicle, a type of service that the vehicle is providing, an estimated demand for providing the service, a number of additional vehicles providing the service, the amount of time in which the vehicle is providing the service.

Additionally, or alternatively, the charging coordination component 940 may be configured to determine a candidate charging station from among multiple candidate charging stations associated with the geographic region for a vehicle to recharge a battery. Various factors may be considered when determining the candidate charging station, such as, for example, a distance from the vehicle to the charging station(s), a number of available charging positions at respective charging stations, an estimated charge time associated with the respective charging stations, a predicted level of demand for the service, and the like. In some examples, the charging coordination component 940 may prioritize one factor over another when determining a candidate charging station. For example, a first charging station may be located the shortest distance from a vehicle 304, but may have a first estimated charge time that is longer than a second estimated charge time associated with a second charging station and/or a third estimated charge time associated with a third charging station that is located a further distance from the first vehicle than the first charging station is. However, the charging coordination component 940 may make a determination that the additional distance to travel to the second charging station is less severe (e.g., more favorable) than the additional estimated charge time associated with the first charging station. As such, the system may determine the second charging station as the candidate charging station. In some examples, the vehicle and/or charging coordinator may exchange data, associated with the vehicle (e.g., current power state, vehicle location, battery type, etc.), with the individual charging station(s) to get the most accurate estimations regarding charge time, available charging positions, distance, and the like.

The navigation component 942 may include functionality to instruct a vehicle to navigate to a candidate charging station and/or instruct a vehicle to navigate through a charging station. Additionally, or alternatively, the navigation component 942 may instruct an additional vehicle currently located at one of the multiple charging stations associated with a geographical region and/or traveling through the geographical region, to provide a service in place of the a vehicle that has been instructed to cease providing the service and to navigate to a candidate charging station to recharge a battery.

In some examples, the battery component 944 may include functionality to make various determinations regarding power states of batteries associated with vehicles, as described herein. For example, the battery component 944 may be configured to determine if a current power state of a vehicle satisfies a threshold power state for providing a service. As described herein, a service may be one of multiple services that a vehicle is configured to provide, and each individual service may have an associated threshold power state required to provide the service. Additionally, or alternatively, the battery component 944 may periodically receive battery state information from vehicles in the fleet of vehicles providing the service.

Further, the battery component 944 may include functionality to determine when a vehicle has reached a sufficient power state while recharging at a charging station. For example, a vehicle may be positioned at a charging station such that it is receiving energy from a charging position. Once the battery reaches a threshold charge state (e.g., 80% of full capacity) sufficient to provide a service (e.g., a highly demanded service), the battery component 944 may instruct the vehicle to cease charging and return to providing the service.

Additionally, or alternatively, the battery component 944 may analyze health data associated with the battery to determine an overall health of a battery associated with a service vehicle. In some examples, a battery may begin to degrade in health overtime (e.g., lower maximum capacity, slower recharge time, unable to hold a charge, etc.) and the battery component 944 may detect such a degrade based on the current power state data received from the vehicles.

parameter component 540 may analyze the base scenario data for a driving scenario and determine base and/or perturbed parameters associated with the scenario. For the simulated vehicle and each object in the scenario, the parameter component may determine a position of the object, a pose of the object, a size of the object, a velocity of the object, a track of the object, a distance between object and the simulated vehicle or any other object, and the like. The parameter component 540 also can determine parameter data including ranges and/or set of values associated with each base scenario parameter. For example, the parameter component can determine a classification (e.g., vehicle, pedestrian, bicycle, etc.) associated with each object represented in the base scenario data, and can determine a parameter range of values associated with the scenario parameter as represented by the base scenario data. As non-limiting examples, the parameter range for a pedestrian object can indicate that the pedestrian can have a velocity with a range of 0.5-1.5 m/s. For a vehicle object, the parameter range may indicate that the vehicle can have a velocity within a relative range (e.g., +/−30% of the base object velocity) or within an absolute range (e.g., 5 m/s of the base object velocity).

The processor(s) 920 of the computing device(s) 906 and the processor(s) 934 of the computing device(s) 904 can be any suitable processor capable of executing instructions to process data and perform operations as described herein. By way of example and not limitation, the processor(s) 920 and 934 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 922 computing device(s) 906 and the memory 936 of the computing device(s) 904 are examples of non-transitory computer-readable media. The memory 922 and 936 can store an operating system and one or more software applications, instructions, programs, and/or data to implement the methods described herein and the functions attributed to the various systems. In various implementations, the memory 922 and 936 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, aspects of some or all of the components discussed herein can include any models, algorithms, and/or machine learning algorithms. For example, in some instances, the components in the memory 922 and 936 can be implemented as a neural network.

As described herein, an exemplary neural network is an algorithm that passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning or machine-learned algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet52, ResNet101, VGG, DenseNet, PointNet, and the like.

Example Clauses

A. A system for charging vehicle batteries, the system comprising: an electrical power source; a first lane comprising: a first charge component coupled to the electrical power source, the first charge component configured to cause energy to flow to or from a first power storage unit of a first vehicle; and a second charge component coupled to the electrical power source, the second charge component configured to cause energy to flow to or from a second power storage unit of a second vehicle; and a second lane arranged parallel to the first lane, the second lane comprising: a third charge component coupled to the electrical power source, the third charge component configured to cause energy to flow to or from a third power storage unit of a third vehicle; and a fourth charge component coupled to the electrical power source, the fourth charge component configured to cause energy to flow to or from a fourth power storage unit of a fourth vehicle.

B. The system of paragraph A, wherein: the third charge component is configured to cause energy to flow to or from the first power storage unit of the first vehicle; and the fourth charge component is configured to cause energy to flow to or from the second power storage unit of the second vehicle.

C. The system of paragraph A or B, wherein the first charge component comprises an inductive electrical coil for inducing a current in an inductive vehicle coil of the first vehicle.

D. The system of any one of paragraphs A-C, wherein the first charge component comprises an electrical contact terminal for physically contacting an electrical terminal of the first vehicle.

E. The system of any one of paragraphs A-D, further comprising a region encompassing the first lane and the second lane, the region comprising: an ingress connecting the region to a roadway, the ingress being an entrance to the region from the roadway and providing the vehicles with access to a first end of at least one of the first lane or the second lane; and an egress connecting the region to the roadway, the egress being an exit from the region to the roadway and accessible via a second end of at least one of the first lane or the second lane, the second end being opposite the first end.

F. The system of paragraph E, wherein: the ingress is arranged at an angle allowing the vehicle to enter the region from the roadway by making a first single-point turn; and the egress is arranged at the angle allowing the vehicle to exit the region to the roadway by making a second single-point turn.

G. The system of paragraph E, wherein: the first lane is arranged adjacent the second lane, the first lane being closer to the roadway than the second lane, and the first lane further comprises: a first length; and a fifth charge component; and the second lane comprising a second length, the second length being less than the first length.

H. The system of any one of paragraphs A-G, wherein the first charge component is disposed in the first lane and spaced a distance from the second charge component, the distance being greater than or equal to a length of the first vehicle.

I. The system of any one of paragraphs A-H, wherein the first lane is disposed on a first level, and the system further comprising: a housing enclosing the first lane and forming a second level, the housing having a first opening at a first end and a second opening at a second end; and one of a ramp or a lift configured to elevate vehicles from the first level to the second level, wherein the second lane is disposed above the first lane on the second level.

J. The system of any one of paragraphs A-I, wherein the electrical power source comprises at least one of: a universal electrical power source, the universal electrical power source being coupled to the first charge component, the second charge component, the third charge component, and the fourth charge component; or a first power supply coupled to the first charge component, a second power supply coupled to the second charge component, a third power supply coupled to the third charge component, and a fourth power supply coupled to the fourth charge component.

K. A system for charging vehicle batteries, the system comprising: an electrical power source; and a lane comprising: a first charge component disposed at a first location in the lane and coupled to the electrical power source, the first charge component configured to cause energy to flow to or from a first power storage unit of a first vehicle; and a second charge component disposed at a second location in the lane which is spaced from the first location along a length of the lane, the second charge component being coupled to the electrical power source, and the second charge component configured to cause energy to flow to or from a second power storage unit of a second vehicle.

L. The system of paragraph K, wherein the lane is a first lane, and the system further comprising a second lane, the second lane comprising: a third charge component disposed at a third location in the second lane and coupled to the electrical power source, the third charge component configured to cause energy to flow to or from a third battery of a third vehicle; and a fourth charge component disposed at a fourth location in the second lane which spaced from the third location along a length of the second lane, the fourth charge component being coupled to the electrical power source, the fourth charge component configured to cause energy to flow to or from a fourth battery of a fourth vehicle.

M. The system of paragraph K or L, wherein the first charge component comprises an inductive electrical coil and the second vehicle comprises an inductive vehicle coil, wherein the inductive electrical coil is configured to induce a current in the inductive vehicle coil of the second vehicle.

N. The system of any one of paragraphs K-M, wherein the first charge component comprises an electrical contact and the first vehicle comprises a vehicle electrical contact, wherein the electrical contact is configured to be electrically coupled to the vehicle electrical contact.

O. The system of any one of paragraphs K-N, further comprising a region encompassing the lane, the region comprising: an ingress connecting the region to a roadway, the ingress being an entrance to the region from the roadway and providing the vehicle with access to a first end of the lane; and an egress connecting the region to the roadway, the egress being an exit from the region to the roadway and accessible via a second end of the lane, the second end being opposite the first end.

P. The system of paragraph O, wherein: the ingress is arranged at an angle allowing the vehicle to enter the lane of the region from the roadway by making a first single-point turn; and the egress is arranged at the angle allowing the vehicle to exit the lane of the region to the roadway by making a second single-point turn.

Q. The system of any one of paragraphs K-P, wherein the lane is configured to allow the first vehicle to drive unimpeded from the first charge component disposed at the first location in the lane to the second charge component disposed at the second location in the lane.

R. The system of any one of paragraphs K-Q, wherein the first charge component is configured to cause the energy to flow to or from the first power storage unit of the first vehicle automatically and in response to an arrival of the first vehicle at the first location.

S. The system of any one of paragraphs K-R, wherein a first lane of the lanes is disposed on a first level, and the system further comprising: a housing enclosing the first lane and forming a second level, the housing having a first opening at a first end and a second opening at a second end; and one of a ramp or a lift configured to elevate vehicles from the first level to the second level, wherein a second lane of the lanes is disposed above the first lane on the second level.

T. The system of any one of paragraphs K-S, wherein the electrical power source comprises at least one of: a universal electrical power source, the universal electrical power source being coupled to the first charge component and the second charge component; or a first power supply coupled to the first charge component and a second power supply coupled to the second charge component.

U. A vehicle comprising: one or more processors; and one or more non-transitory computer-readable media storing computer-executable instructions that, when executed, cause the system to perform operations comprising: controlling the vehicle to enter an entrance of a lane of a charging station; determining a first charge location of the lane; controlling the vehicle to position the vehicle at the first charge location of the lane; receiving energy from a first charge component at the first charge location to charge a power storage unit of the vehicle; determining that a second charge location of the lane is available, the second charge location being closer to an exit of the lane than the first charge location; based at least in part on determining that the second charge location is available, ceasing to receive energy from the first charge component; controlling the vehicle to travel from the first charge location and to position the vehicle at the second charge location; and receiving energy from a second charge component at the second charge location to charge the power storage unit of the vehicle.

V. The vehicle of paragraph U, the operations further comprising: determining that a charge level of the power storage unit satisfies a first threshold charge level; determining a state of the first charge location of the lane, the state indicating that the first charge location of the lane is at least one of available or occupied by another vehicle; and based at least in part on the state of the first charge location, one of controlling the vehicle to: remain at the second charge location until the charge level of the power storage unit satisfies a second threshold charge level, the second threshold charge level being greater than the first threshold charge level; or travel from the second charge location to the exit of the lane.

W. The vehicle of paragraphs U or V, wherein the lane is a first lane and the first lane is associated with a first range of vehicle charge states, and the charging station further comprises a second lane associated with a second range of vehicle charge states, and the operations further comprising: determining a current charge state of the power storage unit of the vehicle; determining that the current charge state of the power storage unit is within the first range of vehicle charge states; and controlling the vehicle to enter the entrance of the first lane based at least in part on determining that the current charge state of the power storage unit is within the first range of vehicle charge states.

X. The vehicle of any one of paragraphs U-W, wherein the lane is a first lane, and the operations further comprising: determining a current charge state of the power storage unit of the vehicle; determining, via one or more sensors associated with the vehicle, a first estimated charge time associated with the first lane based at least in part on a number of vehicles occupying the first lane and a number of charge locations disposed in the first lane; determining, via the one or more sensors, a second estimated charge time associated with a second lane of the charging station based at least in part on a number of vehicles occupying the second lane and a number of charge locations disposed in the second lane; and controlling the vehicle to enter the entrance of the first lane based at least in part on the current charge state of the power storage unit, the first estimate charge time, and the second estimated charge time.

Y. The vehicle of any one of paragraphs U-X, wherein the first charge component comprises a first induction coil, and the operations further comprising: receiving a signal indicating the first induction coil of the first charge location is proximate to a second induction coil of the vehicle; transmitting, by a microcontroller and based at least partly on the signal being received, a message to a direct current (DC) fast charger pursuant to a signaling protocol; receiving, from the DC fast charger, a DC; converting the DC to an alternating current (AC); transmitting the AC to the first induction coil to induce a current in the second induction coil of the vehicle; and wherein receiving the energy from the first charge component is based at least in part on inducing the current in the second induction coil of the vehicle.

Z. A method of charging a power storage unit of a vehicle, the method comprising: determining a first charge location of a lane of a charging station; controlling the vehicle to enter the lane and position the vehicle at the first charge location; receiving energy from a first charge component at the first charge location to charge the power storage unit of the vehicle; determining that a second charge location of the lane is available, the second charge location being subsequent to the first charge location; controlling the vehicle to position the vehicle at the second charge location; and receiving the energy from a second charge component at the second charge location to charge the power storage unit of the vehicle.

AA. The method of paragraph Z, further comprising: determining that a charge state of the power storage unit satisfies a first threshold charge state; determining that the first charge location of the lane is available; and controlling the vehicle to remain at the second charge location until the charge state of the power storage unit satisfies a second threshold charge state, the second threshold charge state being greater than the first threshold charge state.

AB. The method of paragraphs Z or AA, further comprising: determining that a charge state of the power storage unit satisfies a first threshold charge state; determining that the first charge location of the lane is occupied by an additional vehicle; based at least in part on determining that the first charge location of the lane is occupied by the additional vehicle, ceasing to receive energy from the second charge component; and controlling the vehicle to travel from the second charge location to an exit of the lane.

AC. The method of any one of paragraphs Z-AB, wherein the lane is a first lane and the first lane is associated with a first range of vehicle charge states, and the charging station further comprises a second lane associated with a second range of vehicle charge states, and the method further comprising: determining a current charge state of the power storage unit of the vehicle; determining that the current charge state of the power storage unit is within the first range of vehicle charge states; and controlling the vehicle to enter the first lane of the charging station based at least in part on determining that the current charge state of the power storage unit is within the first range of vehicle charge states.

AD. The method of any one of paragraphs Z-AC, wherein the lane is a first lane, and the method further comprising: determining a current charge state of the power storage unit of the vehicle; determining, via one or more sensors associated with the vehicle, a first estimated charge time associated with the first lane based at least in part on a first number of vehicles occupying the first lane and a first number of charge locations disposed in the first lane; determining, via the one or more sensors, a second estimated charge time associated with a second lane of the charging station based at least in part on a second number of vehicles occupying the second lane and a second number of charge locations disposed in the second lane; determining, based at least in part on the first estimated charge time, the second estimated charge time, and the current charge state of the power storage unit, that the first lane is more favorable than the second lane; and controlling the vehicle to enter the first lane based at least in part on determining that the first lane is more favorable than the second lane.

AE. The method of any one of paragraphs Z-AD, further comprising determining that the second charge location of the lane is available based at least in part on at least one of: sensor data captured by one or more sensors associated with the vehicle; or a signal received from the charging station, the signal indicating that the second charge location of the lane is available.

AF. The method of any one of paragraphs Z-AE, wherein the first charge component comprises a first induction coil, and the method further comprising: receiving a signal indicating the first induction coil of the first charge location is proximate to a second induction coil of the vehicle; transmitting, by a microcontroller and based at least partly on the signal being received, a message to a direct current (DC) fast charger pursuant to a signaling protocol; receiving, from the DC fast charger, a DC; converting the DC to an alternating current (AC); transmitting the AC to the first induction coil to induce a current in the second induction coil of the vehicle; and wherein receiving the energy from the first charge component is based at least in part on inducing the current in the second induction coil of the vehicle.

AG. The method of any one of paragraphs Z-AF, further comprising: prior to receiving the energy from the first charge component, controlling a suspension system of the vehicle to lower first electrically conductive contacts of the vehicle toward second electrically conductive contacts of the first charge component; receiving the energy from the first charge component based at least in part on the first electrically conductive contacts of the vehicle contacting the second electrically conductive contacts of the first charge component; based at least in part on determining that the second charge location is available, controlling the suspension system of the vehicle to raise the first electrically conductive contacts of the vehicle away from the second electrically conductive contacts of the first charge component; and based at least in part on the first electrically conductive contacts of the vehicle distancing from the second electrically conductive contacts of the first charge component, ceasing to receive energy from the first charge component.

AH. One or more non-transitory computer-readable media storing instructions executable by a processor, wherein the instructions, when executed, cause the processor to perform operations comprising: determining a first charge location of a lane of a charging station; controlling a vehicle to enter the lane and position the vehicle at the first charge location; receiving energy from a first charge component at the first charge location to charge a power storage unit of the vehicle; determining that a second charge location of the lane is available, the second charge location being subsequent to the first charge location; controlling the vehicle to position the vehicle at the second charge location; and receiving the energy from a second charge component at the second charge location to charge the power storage unit of the vehicle.

AI. The one or more non-transitory computer-readable media of paragraph AH, wherein the lane is a first lane among multiple lanes of the charging station and the first lane includes a physical boundary restricting the vehicle to the first lane from the multiple lanes of the charging station.

AJ. The one or more non-transitory computer-readable media of paragraphs AH or AI, the operations further comprising: receiving, at a controller associated with the charging station, sensor data from the vehicle, the sensor data indicating a position of the vehicle in the lane of the charging station and the second charge location of the lane; and determining, by the controller and based at least in part on the sensor data, that the second charge location of the lane is available.

AK. The one or more non-transitory computer-readable media of any one of paragraphs AH-AJ, wherein the lane is a first lane and the first lane is associated with a first range of vehicle charge states, and the charging station further comprises a second lane associated with a second range of vehicle charge states, and the operations further comprising: determining a current charge state of the power storage unit of the vehicle; determining that the current charge state of the power storage unit is within the first range of vehicle charge states; and controlling the vehicle to enter the first lane of the charging station based at least in part on determining that the current charge state of the power storage unit is within the first range of vehicle charge states.

AL. The one or more non-transitory computer-readable media of any one of paragraphs AH-AK, the operations further comprising determining that the second charge location of the lane is available based at least in part on at least one of: sensor data captured by one or more sensors associated with the vehicle; or a signal received from the charging station, the signal indicating that the second charge location of the lane is available.

AM. The one or more non-transitory computer-readable media of paragraphs AH-AL, wherein the first charge component comprises a first induction coil, and the operations further comprising: receiving a signal indicating the first induction coil of the first charge location is proximate to a second induction coil of the vehicle; transmitting, by a microcontroller and based at least partly on the signal being received, a message to a direct current (DC) fast charger pursuant to a signaling protocol; receiving, from the DC fast charger, a DC; converting the DC to an alternating current (AC); transmitting the AC to the first induction coil to induce a current in the second induction coil of the vehicle; and wherein receiving the energy from the first charge component is based at least in part on inducing the current in the second induction coil of the vehicle.

AN. The one or more non-transitory computer-readable media of any one of paragraphs AH-AM, the operations further comprising: prior to receiving the energy from the first charge component, controlling a suspension system of the vehicle to lower first electrically conductive contacts of the vehicle toward second electrically conductive contacts of the first charge component; receiving the energy from the first charge component based at least in part on the first electrically conductive contacts of the vehicle contacting the second electrically conductive contacts of the first charge component; based at least in part on determining that the second charge location is available, controlling the suspension system of the vehicle to raise the first electrically conductive contacts of the vehicle away from the second electrically conductive contacts of the first charge component; and based at least in part on the first electrically conductive contacts of the vehicle distancing from the second electrically conductive contacts of the first charge component, ceasing to receive energy from the first charge component.

AO. A system comprising: one or more processors; and one or more non-transitory computer-readable media storing computer-executable instructions that, when executed, cause the system to perform operations comprising: receiving, from a vehicle, first data representing a current power state of a power storage unit of the vehicle; determining second data representing a threshold power state required to provide a service offered by the vehicle for a period of time, the service being associated with a geographical region; determining that the current power state of the power storage unit does not satisfy the threshold power state required to provide the service; based at least in part on determining that the current power state does not satisfy the threshold power state determining a candidate charging station from among multiple charging stations associated with the geographical region; and sending an instruction to the vehicle to navigate to the candidate charging station.

AP. The system of paragraph AO, wherein determining the candidate charging station is based at least in part on at least one of: a first distance of the candidate charging station from a current location of the vehicle; a second distance of the candidate charging station from a planned future location of the vehicle; a number of available charge positions at the candidate charging station; an estimated time to charge the power storage unit of the vehicle at the candidate charging station; or a predicted demand for the candidate charging station.

AQ. The system of paragraphs AO or AP, wherein determining the second data representing the threshold power state required to provide the service offered by the vehicle is based at least in part on at least one of: a number of additional vehicles available to provide the service; a size of the geographical region; or a current or predicted level of demand associated with the service.

AR. The system of any one of paragraphs AO-AQ, wherein the service is a first service and the threshold power state is a first threshold power state, and the operations further comprising: identifying a second service offered by the vehicle, the second service being different from the first service; determining third data representing a second threshold power state to provide the second service for the period of time; determining that the current power state of the power storage unit satisfies the second threshold power state to provide the second service; and instructing the vehicle to provide the second service.

AS. The system of any one of paragraphs AO-AR, wherein the candidate charging station is a first candidate charging station which is a first distance from the vehicle, and the operations further comprising: determining a second candidate charging station from among the multiple charging stations, the second candidate charging station being a second distance from the vehicle, the second distance being less than the first distance; determining a first estimated time of arrival associated with first candidate charging station based at least in part on the first distance; determining a second estimated time of arrival associated with the second candidate charging station based at least in part on the second distance; determining third data associated with the first candidate charging station, the third data representing a first predicted level of demand at the first estimated time of arrival, the first predicted level of demand being associated with the first candidate charging station; determining fourth data associated with a second candidate charging station, the fourth data representing a second predicted level of demand at the second estimated time of arrival, the second predicted level of demand being associated with the second candidate charging station; determining that the first predicted level of demand is lower than the second predicted level of demand; and wherein sending the instruction to the vehicle to travel to the first candidate charging station is based at least in part on determining that the first predicted level of demand is lower than the second predicted level of demand.

AT. A method comprising: receiving, from a vehicle, first data representing a current power state of a power storage unit associated with the vehicle; determining second data representing a threshold power state for providing a service offered by the vehicle, the service being associated with a geographical region; determining that the current power state of the power storage unit does not satisfy the threshold power state for providing the service; determining, based at least in part on determining that the current power state does not satisfy the threshold power state, a candidate charging station associated with the geographical region; and determining navigation instructions to navigate the vehicle to the candidate charging station.

AU. The method of paragraph AT, further comprising: determining a current level of demand associated with the service, the current level of demand corresponding to the geographical region; determining a charge time associated with the vehicle, the charge time based at least in part on the current power state, the current level of demand, and a distance from the vehicle to the candidate charging station; and sending third data to the vehicle, the third data instructing the vehicle to travel to the candidate charging station at the charge time and based at least in part on the navigation instructions.

AV. The method of paragraph AT or AU, wherein the candidate charging station is a first candidate charging station, and the method further comprising: receiving, from the first candidate charging station, third data representing a first number of available charge positions at the first candidate charging station; receiving, from a second candidate charging station associated with the geographical region, fourth data representing a second number of available charge positions at the second candidate charging station; determining that the first number of available charge positions is more favorable than the second number of available charge positions; and determining the navigation instructions to navigate the vehicle to the first candidate charging station based at least in part on the first number of available charge positions being more favorable than the second number of available charge positions.

AW. The method of any one of paragraphs AT-AV, further comprising: sending, to the candidate charging station, the first data representing the current power state of the power storage unit associated with the vehicle; receiving, from the candidate charging station, third data representing an estimated charge time, the estimated charge time representing an estimated amount of time to charge the power storage unit from the current power state to at least the threshold power state for providing the service; and determining the navigation instructions to navigate the vehicle to the candidate charging station based at least in part on the third data.

AX. The method of any one of paragraphs AT-AW, wherein determining the navigation instructions to navigate the vehicle to the candidate charging station is determined by one of a charging coordinator associated with the charging station or the vehicle.

AY. The method of any one of paragraphs AT-AX, wherein the candidate charging station is a first candidate charging station which is a first distance from the vehicle, and the method further comprising: determining a second candidate charging station associated with the geographical region, the second candidate charging station being a second distance from the vehicle, the second distance being less than the first distance; determining a first estimated time of arrival associated with first candidate charging station based at least in part on the first distance; determining a second estimated time of arrival associated with the second candidate charging station based at least in part on the second distance; determining third data associated with the first candidate charging station, the third data representing a first predicted level of demand at the first estimated time of arrival, the first predicted level of demand being associated with the first candidate charging station; determining fourth data associated with a second candidate charging station, the fourth data representing a second predicted level of demand at the second estimated time of arrival, the second predicted level of demand being associated with the second candidate charging station; determining that the first predicted level of demand is lower than the second predicted level of demand; and determining the navigation instructions to navigate the vehicle to the first candidate charging station based at least in part on determining that the first predicted level of demand is lower than the second predicted level of demand.

AZ. The method of any one of paragraphs AT-AY, further comprising: determining a predicted threshold power state for providing the service at a future point in time based at least in part on a predicted level of demand for the service at the future point in time; determining that the current power state of the power storage unit does not satisfy the predicted threshold power state for providing the service at the future point in time; and causing the vehicle to remain at the candidate charging station until the current power state of the power storage unit satisfies the predicted threshold power state for providing the service at the future point in time.

BA. The method of any one of paragraphs AT-AZ, wherein the vehicle is a first vehicle, the power storage unit is a first power storage unit, and the current power state is a first current power state, and the method further comprising: identifying a second vehicle associated with a second power storage unit having a second power state that satisfies the threshold power state for providing the service, the second vehicle being available to provide the service and being located at a charging station associated with the geographical region; sending third data to the second vehicle, the third data instructing the second vehicle to provide the service offered by the first vehicle; and sending fourth data to the first vehicle, the fourth data instructing the first vehicle to navigate to the candidate charging station based at least in part on the navigation instructions.

BB. A vehicle comprising: one or more processors; and one or more non-transitory computer-readable media storing computer-executable instructions that, when executed, cause the vehicle to perform operations comprising: determining first data representing a current power state of a power storage unit of the vehicle; determining second data representing a threshold power state to provide a service offered by the vehicle for a period of time, the service being associated with a geographical region; determining that the current power state of the power storage unit does not satisfy the threshold power state to provide the service; based at least in part on determining that the current power state does not satisfy the threshold power state determining a candidate charging station from among multiple charging stations associated with the geographical region; determining navigation instructions to navigate to the candidate charging station; and controlling the vehicle to travel to the candidate charging station based at least in part on the navigation instructions.

BC. The vehicle of paragraph BB, the operations further comprising: sending the first data representing the current power state of the power storage unit to a charging coordinator associated with the vehicle; receiving third data including an indication that the candidate charging station is based at least in part on at least one of: a distance of the candidate charging station from a current location of the vehicle; a number of available charge positions at the candidate charging station; an estimated time to charge the power storage unit of the vehicle at the candidate charging station; or a predicted demand for the candidate charging station.

BD. The vehicle of paragraph BB or BC, wherein determining the second data representing the threshold power state to provide the service offered by the vehicle is based at least in part on at least one of: a number of additional vehicles available to provide the service; a size of the geographical region; or a current or predicted level of demand associated with the service.

BE. The vehicle of any one of paragraphs BB-BD, wherein the service is a first service and the threshold power state is a first threshold power state, and the operations further comprising: identifying a second service offered by the vehicle, the second service being different from the first service; determining third data representing a second threshold power state to provide the second service for the period of time; determining that the current power state of the power storage unit satisfies the second threshold power state to provide the second service; and instructing the vehicle to provide the second service.

BF. The vehicle of any one of paragraphs BB-BE, the operations further comprising: receiving, from a charging coordinator associated with the vehicle, third data including an indication of a charge time associated with the candidate charging station, the charge time being based at least in part on the current power state, a current level of demand associated with the service, and a distance from the vehicle to the candidate charging station; and instructing the vehicle to navigate to the candidate charging station at the charge time.

BG. The vehicle of any one of paragraphs BB-BF, further comprising: sending, to the candidate charging station, the first data representing a current power state of the power storage unit associated with the vehicle; receiving, from the candidate charging station, third data representing an estimated charge time associated with the candidate charging station, the estimated charge time representing an amount of time to charge the power storage unit from the current power state to at least the threshold power state for providing the service; and wherein determining the navigation instructions to navigate the vehicle to the candidate charging station is based at least in part on the third data.

BH. The vehicle of any one of paragraphs BB-BG, wherein the candidate charging station is a first candidate charging station which is a first distance from the vehicle, and the operations further comprising: determining a second candidate charging station from among the multiple charging stations, the second candidate charging station being a second distance from the vehicle, the second distance being less than the first distance; determining a first estimated time of arrival associated with first candidate charging station based at least in part on the first distance; determining a second estimated time of arrival associated with the second candidate charging station based at least in part on the second distance; sending the first estimated time of arrival to the first candidate charging station; sending the second estimated time of arrival to the second candidate charging station; receiving, from the first candidate charging station, third data representing a first predicted level of demand at the first estimated time of arrival, the first predicted level of demand being associated with the first candidate charging station; receiving, from the second candidate charging station, fourth data representing a second predicted level of demand at the second estimated time of arrival, the second predicted level of demand being associated with the second candidate charging station; determining that the first predicted level of demand is lower than the second predicted level of demand; and wherein determining the navigation instructions to navigate the vehicle to the first candidate charging station is based at least in part on determining that the first predicted level of demand is lower than the second predicted level of demand.

While the example clauses described above are described with respect to one particular implementation, it should be understood that, in the context of this document, the content of the example clauses may also be implemented via a method, device, system, computer-readable medium, and/or another implementation. Additionally, any of examples A-BH may be implemented alone or in combination with any other one or more of the examples A-BH.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system for charging vehicle batteries, the system comprising:
    an electrical power source;
    a first lane comprising:
    a first charge component coupled to the electrical power source, the first charge component configured to cause energy to flow to or from a first power storage unit of a first vehicle; and
    a second charge component coupled to the electrical power source, the second charge component configured to cause energy to flow to or from a second power storage unit of a second vehicle; and
    a second lane arranged parallel to the first lane, the second lane comprising:
    a third charge component coupled to the electrical power source, the third charge component configured to cause energy to flow to or from a third power storage unit of a third vehicle; and
    a fourth charge component coupled to the electrical power source, the fourth charge component configured to cause energy to flow to or from a fourth power storage unit of a fourth vehicle wherein at least one of the first charge component is configured to cause energy to flow to or from the second power storage unit of the second vehicle, or the third charge component is configured to cause energy to flow to or from the fourth power storage unit of the fourth vehicle.

2. The system of claim 1, wherein:
    the third charge component is configured to cause energy to flow to or from the first power storage unit of the first vehicle; and
    the fourth charge component is configured to cause energy to flow to or from the second power storage unit of the second vehicle.

3. The system of claim 1, wherein the first charge component comprises an inductive electrical coil for inducing a current in an inductive vehicle coil of the first vehicle.

4. The system of claim 1, wherein the first charge component comprises an electrical contact terminal for physically contacting an electrical terminal of the first vehicle.

5. The system of claim 1, further comprising a region encompassing the first lane and the second lane, the region comprising:
    an ingress connecting the region to a roadway, the ingress being an entrance to the region from the roadway and providing access to a first end of at least one of the first lane or the second lane; and
    an egress connecting the region to the roadway, the egress being an exit from the region to the roadway and accessible via a second end of at least one of the first lane or the second lane, the second end being opposite the first end.

6. The system of claim 5, wherein:
    the ingress is arranged at an angle allowing entry to the region from the roadway by making a first single-point turn; and
    the egress is arranged at the angle allowing exit from the region to the roadway by making a second single-point turn.

7. The system of claim 5, wherein:
    the first lane is arranged adjacent the second lane, the first lane being closer to the roadway than the second lane, and the first lane further comprises:
    a first length; and
    a fifth charge component; and
    the second lane comprising a second length, the second length being less than the first length.

8. The system of claim 1, wherein the first charge component is disposed in the first lane and spaced a distance from the second charge component, the distance being greater than or equal to a length of the first vehicle.

9. The system of claim 1, wherein the first lane is disposed on a first level, and the system further comprising:
    a housing enclosing the first lane and forming a second level, the housing having a first opening at a first end and a second opening at a second end and configured to elevate vehicles from the first level to the second level, wherein the second lane is disposed above the first lane on the second level.

10. The system of claim 1, wherein the electrical power source comprises at least one of:
    a universal electrical power source, the universal electrical power source being coupled to the first charge component, the second charge component, the third charge component, and the fourth charge component; or a first power supply coupled to the first charge component, a second power supply coupled to the second charge component, a third power supply coupled to the third charge component, and a fourth power supply coupled to the fourth charge component.

11. A system for charging vehicle power storage units, the system comprising:

an electrical power source; and a first lane comprising:
- a first charge component disposed at a first location in the first lane and coupled to the electrical power source, the first charge component configured to cause energy to flow to or from a first power storage unit of a first vehicle;
- a second charge component disposed at a second location in the first lane which is spaced from the first location along a length of the first lane, the second charge component being coupled to the electrical power source, and the second charge component configured to cause energy to flow to or from a second power storage unit of a second vehicle;

a second lane comprising:
- a third charge component disposed at a third location in the second lane and coupled to the electrical power source, the third charge component configured to cause energy to flow to or from a power storage unit of a third vehicle; and
- a fourth charge component disposed at a fourth location in the second lane which spaced from the third location along a length of the second lane, the fourth charge component being coupled to the electrical power source, the fourth charge component configured to cause energy to flow to or from a fourth power storage unit of a fourth vehicle wherein at least one of the first charge component is configured to cause energy to flow to or from the second power storage unit of the second vehicle, or the third charge component is configured to cause energy to flow to or from the power storage unit of the fourth vehicle.

12. The system of claim 11, wherein the first charge component comprises an inductive electrical coil and the second vehicle comprises an inductive vehicle coil, wherein the inductive electrical coil is configured to induce a current in the inductive vehicle coil of the second vehicle.

13. The system of claim 11, wherein the first charge component comprises an electrical contact and the first vehicle comprises a vehicle electrical contact, wherein the electrical contact is configured to be electrically coupled to the vehicle electrical contact.

14. The system of claim 11, further comprising a region encompassing at least one of the first lane or the second lane, the region comprising:

an ingress connecting the region to a roadway, the ingress being an entrance to the region from the roadway and providing access to a first end of the at least one of the first lane or the second lane; and an egress connecting the region to the roadway, the egress being an exit from the region to the roadway and accessible via a second end of the at least one of the first lane or the second lane, the second end being opposite the first end.

15. The system of claim 14, wherein:

the ingress is arranged at an angle allowing entry to the at least one of the first lane or the second lane of the region from the roadway by making a first single-point turn; and the egress is arranged at the angle allowing exit from the at least one of the first lane or the second lane of the region to the roadway by making a second single-point turn.

16. The system of claim 14, wherein:

the first lane is arranged adjacent to the second lane, the first lane being closer to the roadway than the second lane, and the first lane further comprises:

a first length; and a fifth charge component; and the second lane comprising a second length, the second length being less than the first length.

17. The system of claim 11, wherein the first lane is configured to allow the first vehicle to drive unimpeded from the first charge component disposed at the first location in the first lane to the second charge component disposed at the second location in the first lane.

18. The system of claim 11, wherein the first charge component is configured to cause the energy to flow to or from the first power storage unit of the first vehicle automatically and in response to an arrival of the first vehicle at the first location.

19. The system of claim 11, wherein the first lane is disposed on a first level, and the system further comprising:

a housing enclosing the first lane and forming a second level, the housing having a first opening at a first end and a second opening at a second end and configured to elevate vehicles from the first level to the second level, wherein the second lane is disposed above the first lane on the second level.

20. The system of claim 11, wherein the electrical power source comprises at least one of:

a universal electrical power source, the universal electrical power source being coupled to the first charge component and the second charge component; or a first power supply coupled to the first charge component and a second power supply coupled to the second charge component.

* * * * *